(12) United States Patent
Townsel et al.

(10) Patent No.: US 12,544,053 B2
(45) Date of Patent: Feb. 10, 2026

(54) NONINVASIVE SUTURE DELIVERY DEVICE

(71) Applicant: THE REGENTS OF THE UNIVERSITY OF MICHIGAN, Ann Arbor, MI (US)

(72) Inventors: Courtney Townsel, Canton, MI (US); Adrienne R. Harris, Clinton, MI (US); Jeffrey E. Ransden, Fairfield, CT (US); Nathaniel Johnson, Ypsilanti, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 132 days.

(21) Appl. No.: 18/701,183

(22) PCT Filed: Oct. 26, 2022

(86) PCT No.: PCT/US2022/047813
§ 371 (c)(1),
(2) Date: Apr. 12, 2024

(87) PCT Pub. No.: WO2023/076334
PCT Pub. Date: May 4, 2023

(65) Prior Publication Data
US 2025/0000497 A1    Jan. 2, 2025

Related U.S. Application Data

(60) Provisional application No. 63/273,005, filed on Oct. 28, 2021.

(51) Int. Cl.
*A61B 17/00* (2006.01)
*A61B 17/42* (2006.01)
*A61B 90/00* (2016.01)

(52) U.S. Cl.
CPC .......... *A61B 17/0057* (2013.01); *A61B 17/42* (2013.01); *A61B 90/08* (2016.02);
(Continued)

(58) Field of Classification Search
CPC ..... A61B 17/0057; A61B 17/42; A61B 90/08; A61B 2090/0807; A61B 2017/00407;
(Continued)

(56) References Cited

U.S. PATENT DOCUMENTS 5,855,586 A * 1/1999 Habara ............ A61B 17/12009
606/139
8,771,297 B2 * 7/2014 Miller ................ A61B 17/0467
606/139
(Continued)

OTHER PUBLICATIONS

International Search Report and Written Opinion, corresponding International Application No. PCT/US2022/047813, mailing date Feb. 17, 2023.

*Primary Examiner* — Phong Son H Dang
(74) *Attorney, Agent, or Firm* — MARSHALL, GERSTEIN & BORUN LLP

(57) ABSTRACT

A noninvasive suture delivery device includes a housing including a distal end and a trigger. An arm assembly is operably coupled to the distal end of the housing and includes a tubular body and a distal end. A suture includes a closed loop and a string. The closed loop defines an opening extending from the distal end of the arm assembly. The string extends from the closed loop and through the tubular body of the arm assembly. When the trigger is activated, a dimension of the opening of the closed loop decreases.

17 Claims, 14 Drawing Sheets

(52) U.S. Cl.
CPC .............. *A61B 2017/00407* (2013.01); *A61B 2017/00477* (2013.01); *A61B 2017/00623* (2013.01); *A61B 2017/00663* (2013.01); *A61B 2090/0807* (2016.02)

(58) Field of Classification Search
CPC ........... A61B 2017/00477; A61B 2017/00623; A61B 2017/00663
See application file for complete search history.

(56) References Cited

U.S. PATENT DOCUMENTS

| | | | |
|---|---|---|---|
| 9,144,428 B2 * | 9/2015 | Binmoeller | A61B 17/1285 |
| 9,408,608 B2 * | 8/2016 | Clark, III | A61B 90/39 |
| 9,498,206 B2 * | 11/2016 | Fung | A61B 17/0469 |
| 10,292,710 B2 * | 5/2019 | Clark, III | A61B 17/12013 |
| 2002/0010480 A1 | 1/2002 | Sancoff et al. | |
| 2010/0069925 A1 * | 3/2010 | Friedman | A61B 17/12013 |
| | | | 606/144 |
| 2010/0174296 A1 | 7/2010 | Vakharia et al. | |
| 2014/0276911 A1 * | 9/2014 | Smith | A61B 17/32056 |
| | | | 606/113 |
| 2016/0310144 A1 * | 10/2016 | Kimura | A61B 17/12013 |
| 2016/0317155 A1 * | 11/2016 | Kimura | A61B 17/29 |
| 2016/0346028 A1 * | 12/2016 | Rogers | A61F 2/4081 |
| 2017/0100183 A1 * | 4/2017 | Iaizzo | A61B 18/1492 |
| 2020/0078012 A1 | 3/2020 | Sauer | |
| 2020/0222053 A1 | 7/2020 | Ranallo et al. | |

* cited by examiner

NONINVASIVE SUTURE DELIVERY DEVICE

RELATED APPLICATION

This application is a 35 U.S.C. § 371 National Stage of International Patent Application No. PCT/US2022/047813, filed Oct. 26, 2022, which itself claims the benefit of and priority to U.S. Provisional Patent Application No. 63/273,005, filed Oct. 28, 2021, the content of each of which is incorporated by reference herein in their entireties and for all purposes.

FIELD OF DISCLOSURE

The present disclosure relates to a suture delivery device, and more particularly, a handheld noninvasive suture delivery device.

BACKGROUND

Preterm birth is defined as a birth that occurs before 37 weeks of gestation, which can be further categorized into extreme preterm (<28 weeks), very preterm (28-32 weeks), moderate preterm (32-24 weeks) and late preterm (34-36 weeks). Pregnancies at or beyond 37 weeks of gestation are considered "term" pregnancies. Preterm birth is the leading cause of death for children younger than 5 years of age, with more than a million infant deaths attributed to preterm birth annually. Globally, over 15 million births are preterm annually.

Preterm births may occur for a number of reasons ranging from behavioral (smoking or drinking during pregnancy) and previous uterine or cervical trauma, to physiological issues such as cervical insufficiency or "short cervix." Cervical insufficiency (also known as cervical weakness or cervical incompetence) is an obstetric condition wherein the cervix begins to dilate and thin in the early second trimester (14-20 weeks), which can lead to miscarriage or an extremely preterm birth. Cervical shortening, which can be measured during an ultrasound exam, refers to abnormally shallow cervical tissue. A short cervical length directly correlates with risk of preterm birth. For example, cervical length less than 25 mm carries an 18% risk of preterm birth, while length less than 15 mm carries a 50% risk of preterm birth.

Depending on the potential underlying cause, there are a variety of treatments and mitigation strategies to address preterm birth risk, including: behavioral modification to minimize risk factors (smoking cessation, modified bed rest, etc.); progesterone and progesterone analogues to address shortened cervix; cervical pessary—a silicone 'cap' that seals the cervix and is designed to prevent the onset of labor; and surgical intervention to strengthen and close the cervix, a technique known as cervical cerclage.

The cervical cerclage technique, developed in the 1950s, has remained virtually unchanged since its initial development and carries significant health risks for both the mother and fetus. Cervical cerclage, which is also known as a cervical stitch, is a medical treatment in which a strong suture is sewn into and around the cervix to keep it closed and prevent miscarriage or preterm birth. The procedure includes placing a non-absorbable suture trans-vaginally through the cervix to support an ongoing pregnancy and prevent premature shortening or opening of the cervix. The procedure is then reversed at 37 weeks by removing the suture, once the pregnancy has technically made it to "term." The major draw backs to this procedure are the potential for serious complications including rupture of membranes, premature labor, injury to the cervix or bladder, need for general or spinal anesthesia and bleeding. Another drawback is the cervical cerclage has not shown any clinical benefit in women with a multi-gestational pregnancy, which is one of the leading causes of preterm birth.

While cervical cerclage is generally effective (80% reduction of preterm birth risk in treated vs. untreated populations in clinical studies), the surgical technique carries significant risks for the mother including negative reactions to general anesthesia, blood loss, and hospital acquired infection. The procedure is also of significant risk to the fetus, as nicking the amniotic membrane or infection of the amniotic sac can lead to even earlier preterm birth or miscarriage.

Currently, obstetricians have a way to screen pregnant women for cervical insufficiency through the use of abdominal and/or transvaginal ultrasound. This practice has not gained universal acceptance because there is no clear intervention that can be offered to all women with a short cervix found on ultrasound that has been shown to be effective and safe.

SUMMARY

In an exemplary iteration of the present disclosure, an obstetric medical device may be used to apply a cervical cerclage suture noninvasively. There are two available designs: the first is a single arm with a suture loop on the end, and the second is a dual arm design in which the arms can be opened to facilitate slipping a closed loop over the cervix. In both designs, the suture loop is tied and the excess suture material is fed through the arm and can be used to tighten the loop by tugging on the excess string.

In a first example, a noninvasive suture delivery device may include a housing including a distal end and a trigger. An arm assembly may be operably coupled to the distal end of the housing. The arm assembly may include a tubular body and a distal end. A suture may include a closed loop and a string. The closed loop may define an opening extending from the distal end of the arm assembly. The string may extend from the closed loop and through the tubular body of the arm assembly. When the trigger is activated, a dimension of the opening of the closed loop may decrease.

In a second example, a suture delivery device may include a handle having a lever operably coupled with a rotatable drum. An arm may include a proximal end operably coupled with a distal end of the handle. A suture may include a closed loop extending from a distal end of the arm and a string connected to the loop and operably coupled to the rotatable drum of the handle. When the lever of the handle is compressed, the rotatable drum may rotate in a first direction to decrease a dimension of the closed loop.

In a third example, a method of delivering a noninvasive suture around a portion of the cervix. The method may include inserting a closed loop into a vaginal canal. The closed loop may extend from a distal end of a hand-held suture delivery device. The hand-held suture delivery device may include an arm assembly operably coupled to a housing. The closed loop may include a first string extending from the closed loop, through the arm assembly, and into the housing. The method may include disposing the closed loop around a portion of a cervix, tightening the closed loop around the portion of the cervix, and cutting the string of the suture.

In further accordance with any one or more of the forgoing first, second, and third examples, a noninvasive suture delivery device and method of delivery a noninvasive suture may include any one or more of the following forms.

In one example, the string may be operably coupled with a tightening mechanism disposed in an interior cavity of the housing.

In one example, the trigger may be arranged to activate the tightening mechanism to decrease the dimension of the opening of the closed loop.

In another example, the tightening mechanism may be arranged to transfer a force to the string of the suture.

In one example, the force may be in a range of approximately 3 lbf to approximately 6 lbf.

In some examples, the tightening mechanism may be a ratchet device including a rotatable drum.

In another example, a portion of the string may be operably coupled with the rotatable drum.

In one form, the arm assembly may include a first arm and a second arm.

In another form, the tubular body may include a tube of the first arm and a tube of the second arm.

In another form, the string of the suture may include a first portion and a second portion.

In another form, the first portion may extend through the tube of the first arm and the second portion may extend through the tube of the second arm.

In some forms, the closed loop may include a first loop concentrically aligned with a second loop.

In another form, the first loop may be connected to the first portion of the string and the second loop may be connected to the second portion of the string.

In one example, the arm assembly may include a movable spacer disposed between the first and second arms.

In some examples, when the movable spacer moves in a first direction, a space between the first and second arms may increase.

In some examples, when the spacer moves in a second direction, the space between the first and second arms may decrease.

In one example, the spacer may be operably coupled to a rotatable knob.

In some examples, when the knob is rotated in a first direction, the space between the first and second arms may increase.

In some examples, when the knob is rotated in a second direction, opposite the first direction, the space between the first and second arms may decrease.

In another example, an opening in the handle may be disposed between the ratchet assembly and the distal end of the handle, In some examples, the string may be accessible through the opening of the handle.

In one example, an indicator assembly may be coupled to the rotatable drum.

In some examples, the indicator assembly may be movable between a first position and a second position spaced from the first position.

In one example, when the indicator assembly is in the first position, a torque in the rotatable drum may be greater than a force of the restraining torque provided by a spring coupled to the rotatable drum.

In some examples, when the indicator assembly is in the second position, the torque in the rotatable drum may be equal to or less than the restraining torque provided by the spring.

In some examples, the arm may include a first arm having a tubular body and a second arm having a tubular body.

In one example, the string may include a first portion connected to a first loop and disposed through the tubular body of the first arm.

In another example, the string may include a second portion connected to a second loop and disposed through the tubular body of the second arm.

In some examples, the first and second loops may be concentrically arranged to define the closed loop.

In one form, the method may include inserting at least a portion of the arm assembly into the vaginal canal.

In some examples, the arm assembly may include a first arm operably coupled to a first loop of the closed loop and a second arm operably coupled to a second loop of the closed loop.

In one example, the first loop may be concentrically disposed relative to the second loop.

In another form, the method may include changing a space between the first arm and the second arm by moving a spacer.

In some forms, moving the spacer may include rotating a knob operably coupled with the housing.

In one example, the knob may rotate the spacer disposed in a cavity of the housing.

In one example, tightening the closed loop may include pulling one or more of the first and second strings to decrease a dimension of the closed loop.

In one example, tightening the closed loop may include compressing a lever of the housing.

In another example, cutting the string of the suture may include cutting a portion of the string through an opening in the housing.

DETAILED DESCRIPTION

Figure 1:
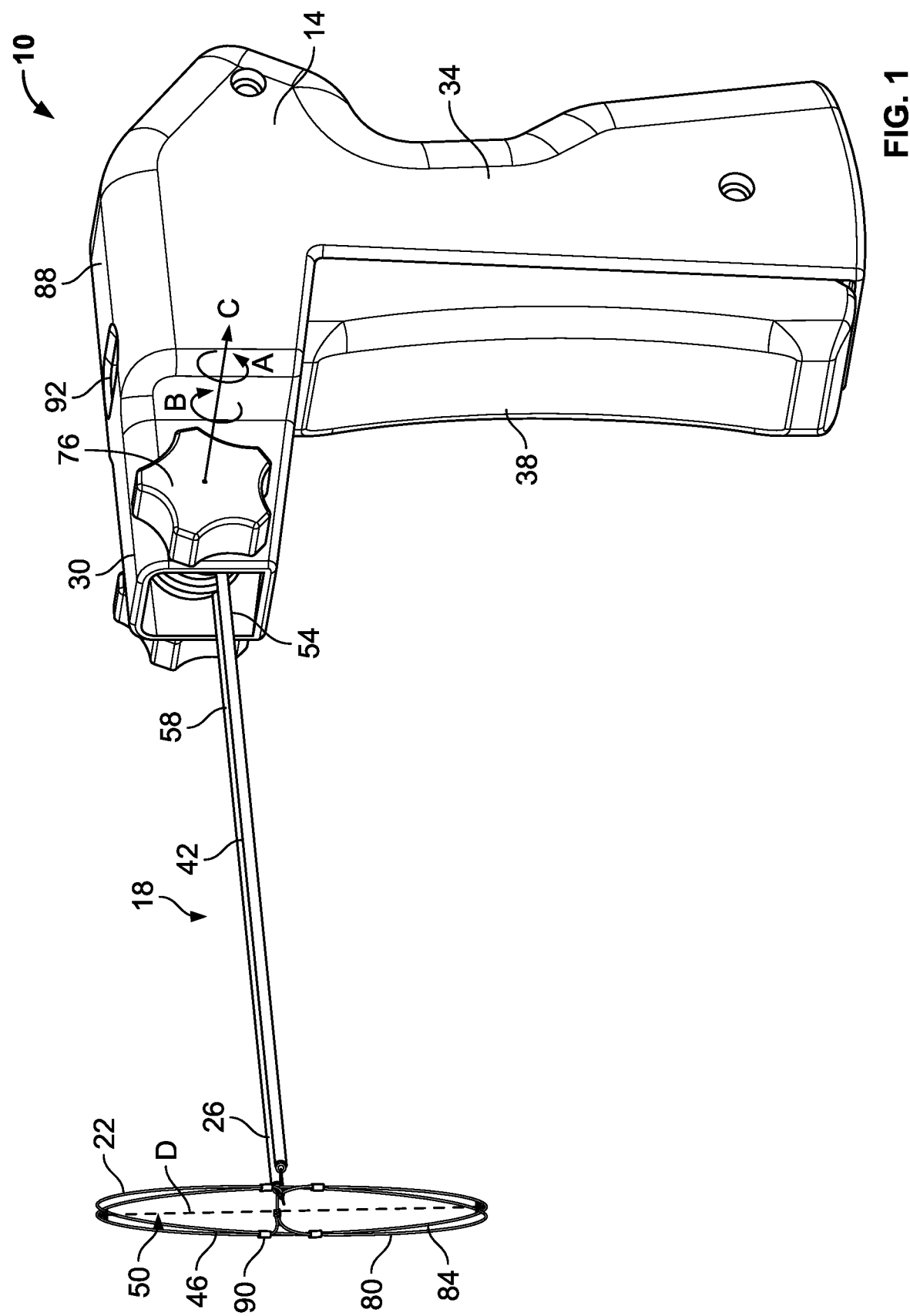
FIG. 1 is perspective view of a noninvasive suture delivery device assembled in accordance with the teachings of the present disclosure.

A suture delivery device 10 is provided in FIG. 1, and is used to deliver a cervical cerclage noninvasively. Generally speaking, the device 10 includes a housing 14, an arm assembly 18 operably coupled to the housing 14, and a suture 22 extending from a distal end 26 of the arm assembly 18. The housing 14, which may be operated as a handle of the device, includes a distal end 30 and a grip 34. A trigger assembly 38 is operably coupled with the housing 14 to tightening the suture 22. The arm assembly 18 is operably coupled to the distal end 30 of the housing 14 and includes a tubular body 42 and distal end 26. The suture 22 includes a closed loop 46 defining an opening 50 and that extends from the distal end 26 of the arm assembly 18. The suture 22 also includes a string (hidden in FIG. 1) that extends from the closed loop 46 and through the tubular body 42 of the arm assembly 18. The string is operably coupled to a tightening mechanism disposed in the housing 14 such that when the trigger assembly 38 is activated, a dimension D of the opening 50 of the closed loop 46 decreases.

Figure 2:
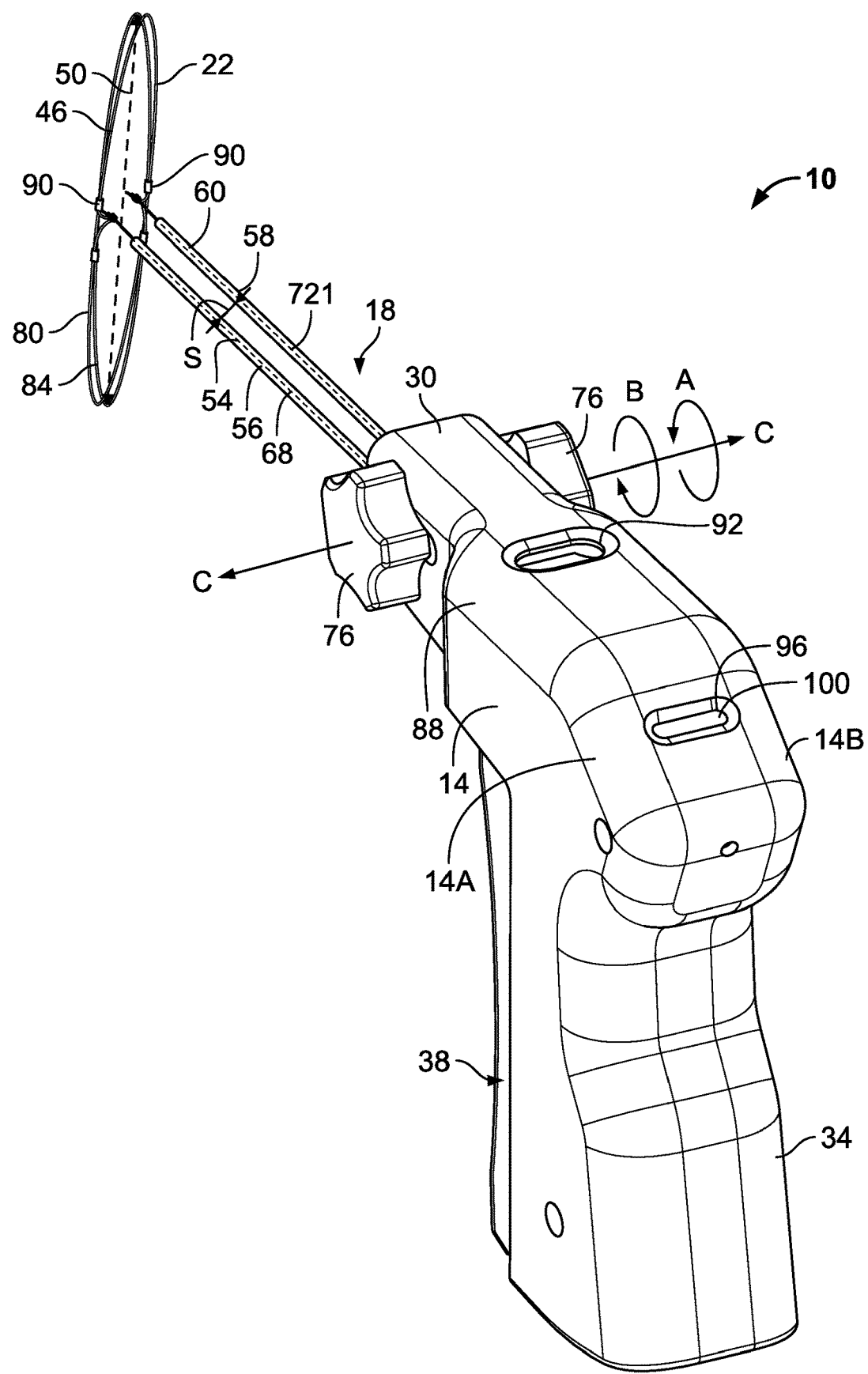
FIG. 2 is a partial back perspective view of the device of FIG. 1.

The arm assembly 18 of FIGS. 1 and 2 includes a first arm 54 having a tubular body 56 and a second arm 58 including a tubular body 60. The string 64 (FIG. 4) includes a first portion 68 that extends from the closed loop 46 and through the tubular body 56 of the first arm 54 and a second portion 72 that extends from the closed loop 46 through the tubular body 60 of the second arm 58. The arm assembly 18 includes a movable spacer 74 (FIG. 6) that is disposed between the first and second arms 54, 58 and actuated to increase or decrease a distance S between the first and second arms 54, 58. A knob 76 coupled to the distal end 30 of the housing 14 actuates the spacer 74 such that when the movable spacer 74 moves in a first direction A, a space S between the first and second arms 54, 58 increases to widen the opening 50 of the closed loop 46. When the spacer 74 moves in a second direction B, opposite the first direction A, the space S between the first and second arms 54, 58 decreases, and the opening 50 of the closed loop 46 becomes more slack or more narrow. The narrowing of the arm assembly 18 is useful for initially inserting the arm assembly 18 into a narrow opening (e.g., a vaginal canal), and the widening is useful once the closed loop 46 is inserted in the narrow opening for placement of the suture 22 (e.g., around an outer surface of a cervix). The movable spacer 74 of the illustrated device 10 rotates about an axis C of the knob in an A direction to widen and in a B direction to narrow the space S between the arms 54, 58. However, in other examples, the movable spacer 74 may linear move in the A and B directions to move the arms 54, 58.

In FIG. 2, the closed loop 46 includes a first loop 80 connected to the first portion 68 of the string 64 and tied with a Pitzen knot 86, and a second loop 84 connected to the second portion 72 of the string 64 and tied with a different Pitzen knot 86. The first and second loops 80, 84 are concentrically aligned and loosely secured together by one or more tubular clasps 90. The first and second loops 80, 84 together to maintain the opening 50 of the closed loop 46, and the tubular clasps permit the first and second portions 68, 72 of the string 64 connected to each loop 80, 84 to slide within the clasps and pass one another when the tightening mechanism is activated. While the illustrated device 10 in FIG. 1 includes two movable arms 54, 58 to narrow, widen, and deliver the suture, in another arrangement, the arm assembly of the device 10 may include one arm to deliver a noninvasive suture.

In the illustrated example, the closed loop 46 may be assembled by forming independent first and second loops 80, 84, aligning the first and second loops 80, 84 together with clasps 90, and threading the first and second portions 68, 72 of the string 64, which correspond to the first and second loops 80, 84, respectively, through the arm assembly 18 and into the housing 14 of the device 10. The first portion 68 extends from the distal end of the first arm 54, routed through and guided by clasps 90, and ends in a Pitzen knot 86 to define the first loop 80. Similarly, the second portion 72 extends from the distal end of the second arm 58, routed through and guided by clasps 90, and ends in a Pitzen knot 86 to define the second loop 84. The first Pitzen knot 86 fastens the first loop 80 and is disposed adjacent to the first arm 54, and the second Pitzen knot 86 fastens the second loop 84 and is disposed adjacent to the second arm 58. Each portion 68, 72 is tied to itself, forming a loop, with a Pitzen knot to allow each formed loop to constrict when the string is pulled 64. The clasps 90 are arranged specifically to facilitate the restriction of the loop.

Due to the double loop arrangement of the suture 22, the first and second portions 68, 72 of the string 64 may be pulled to decrease the dimension D of the opening 50 of the closed loop 46. The dimension D represents a diameter of a circular opening 50, or a width of an oval opening 50. The double loop arrangement of the closed loop 46 is configured so that when the first and second portions 68, 72 of the string 64 are pulled, the first and second loops 80, 84 independently and concentrically collapse with equal force. The clasps 90 may create points of resistance against a target tissue to help with friction. The clasps 90 permit the suture string 64 of the first and second loops 80, 84 to slide when tightening the closed loop 46. So configured, the closed loop arrangement may achieve a "lasso" affect.

Figure 3:
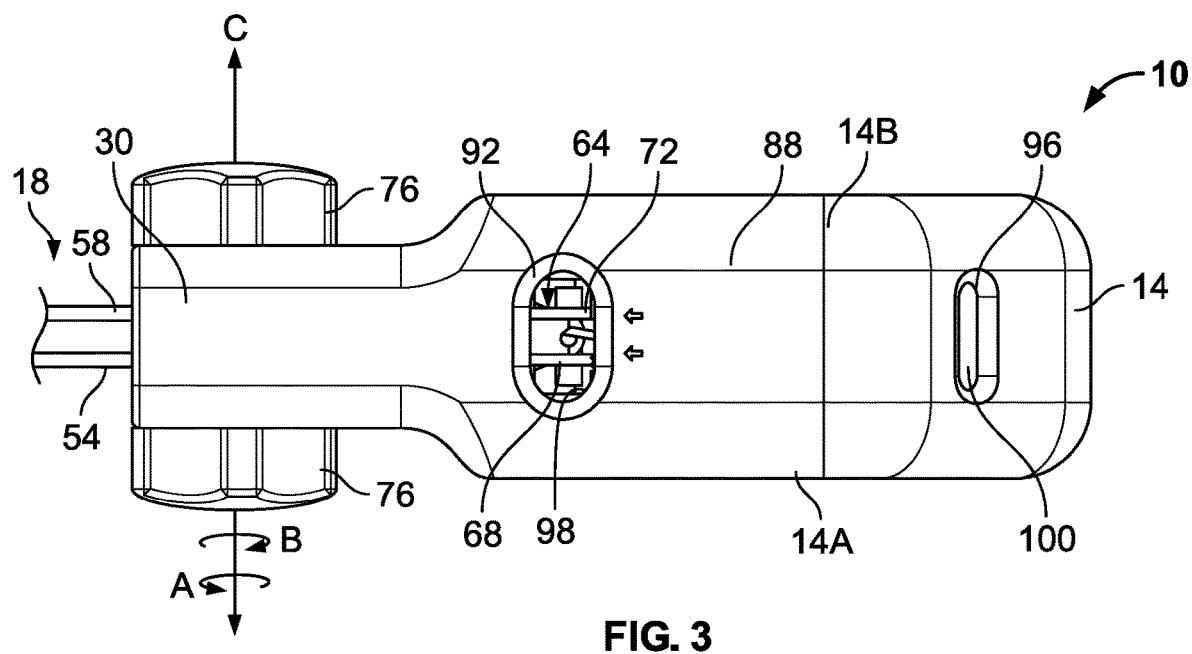
FIG. 3 is a top partial view of the device of FIG. 1.
Figure 4:
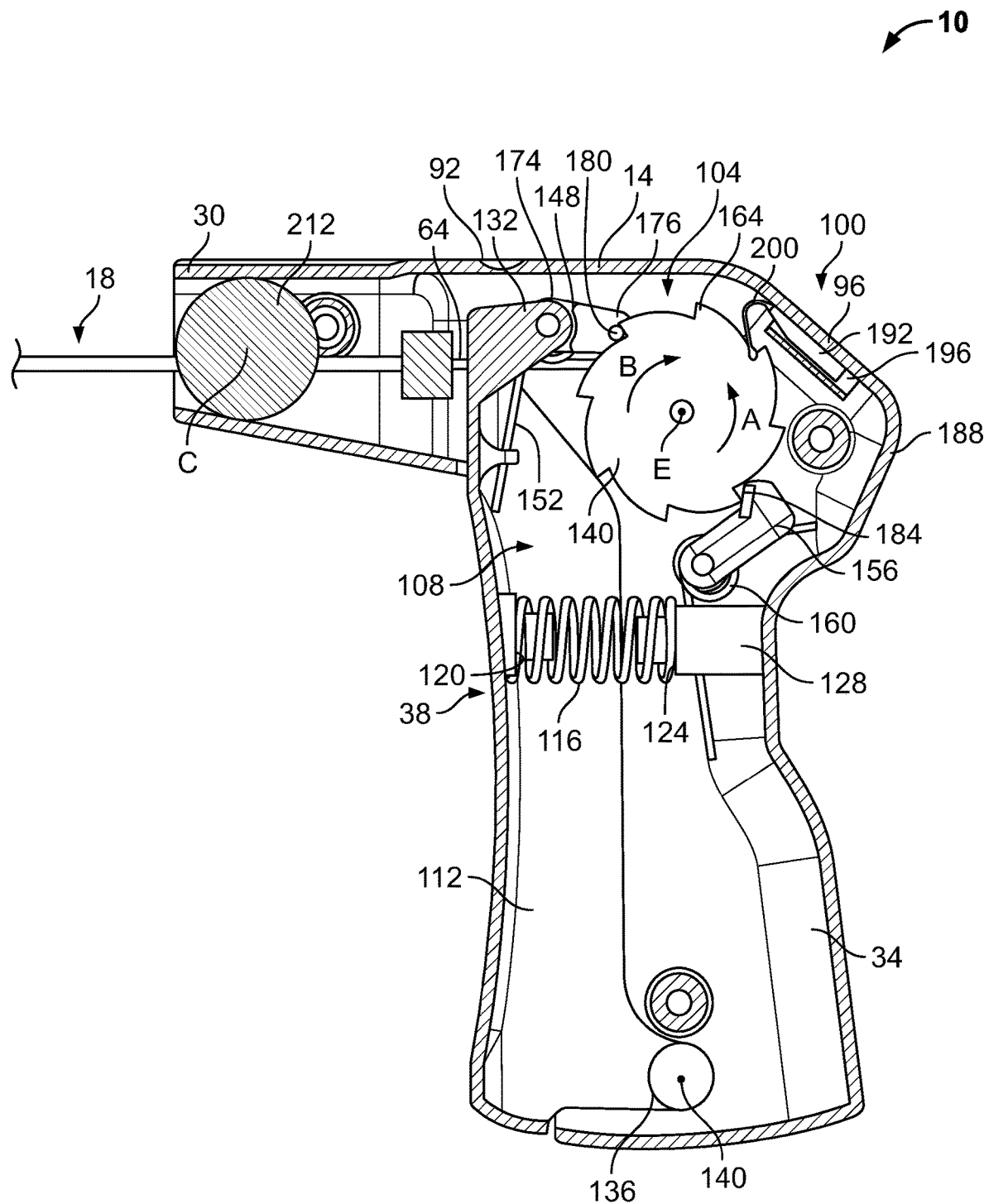
FIG. 4 is a partial, cross-sectional side view of the device of FIG. 1, showing a ratchet assembly of the device in an initial position.

In FIGS. 1-3, the housing 14 includes first and second clam shells 14A, 14B secured together and operatively coupled with the trigger assembly 38. In FIGS. 2 and 3, a top portion 88 of the housing 14 includes a first window 92 and a second window 96. In FIG. 3, the first window 92 defines an opening 98 in the housing 14 for accessing the first and second portions 68, 72 of the string 64 of the suture 22. Specifically, an operator may access the string 64 of the suture 22 with a blade (e.g., scissors) to cut the first and second portions 68, 72 of the string 64 of the suture after the closed loop 46 is delivered and secured in place. The second window 96 exposes a portion of an indicator assembly 100 disposed in an interior cavity of the housing 14. The indicator assembly 100 provides a visual signal through the second window 96 that the closed loop 46 may either be tightened further or cannot be tightened further. The second window 96 may include a transparent cover to shield the interior cavity, or the second window 96 may be open. As shown in FIG. 4, the first window 92 is disposed on a planar surface, relative to the horizontal, of the top portion 88 of the housing 14, whereas the second window 96 is disposed on an angled surface, relative to the horizontal, of the top portion 88. However, in other examples, the first and second windows may be placed on the same planar surface.

Figure 5:
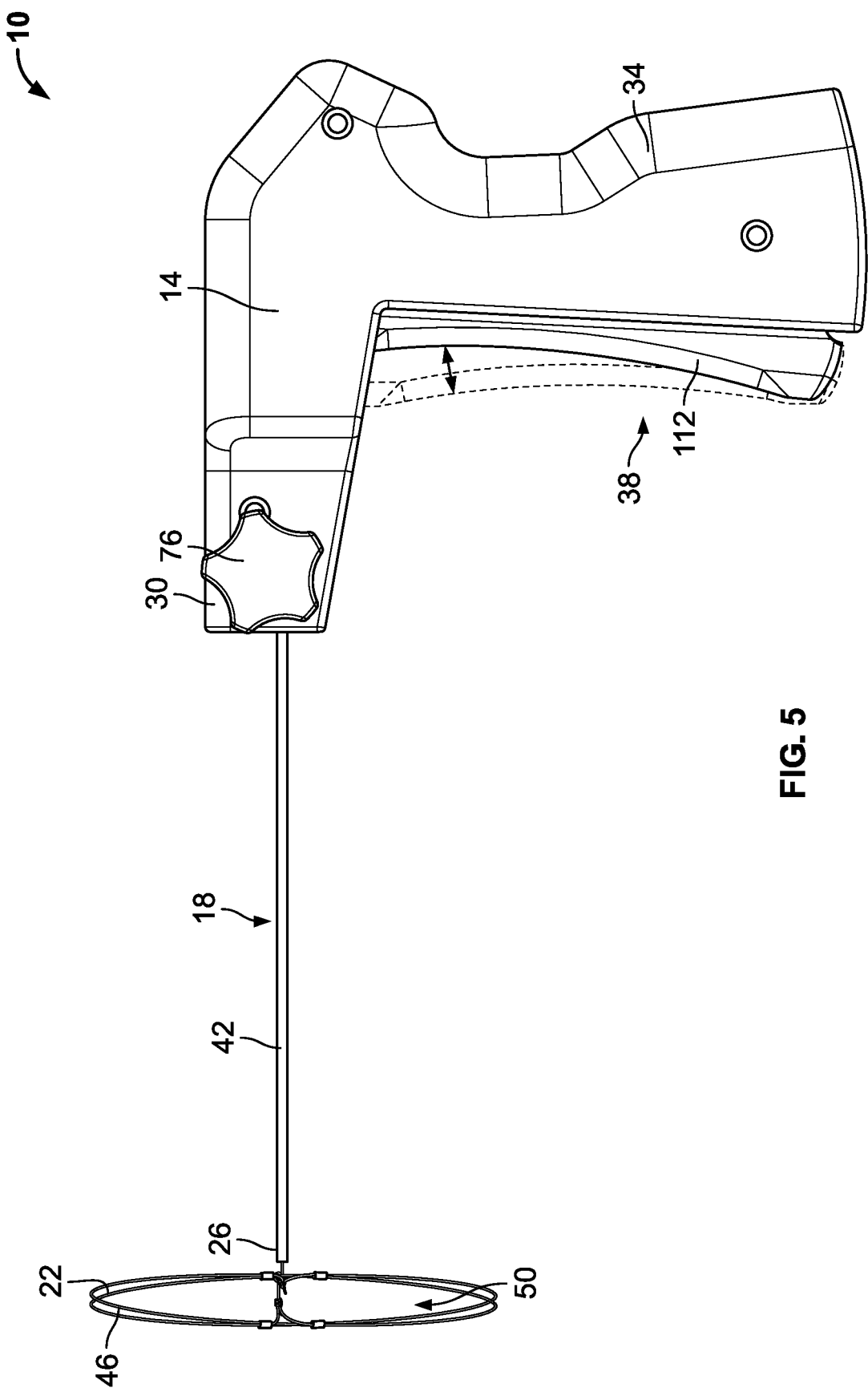
FIG. 5 is a side view of the device of FIG. 1, showing movement of a lever between a first and second position.

In FIG. 4, the trigger assembly 38, a tightening mechanism 104, and the indicator assembly 100 are at least partially disposed in an interior cavity 108 of the housing 14. The trigger assembly 38 includes a lever 112 (also referred herein as a trigger) operably coupled with the housing 14 and a spring 116 that permits a user to pump the lever 112 and tighten the suture 22. The spring 116 engages a first spring seat 120 disposed on an interior side of the lever 112 and a second spring seat 124 disposed on a protrusion 128 extending inwardly from an interior surface of the grip 34 of the housing 14. The spring 116 exerts a biasing force against the interior surface of the lever 112 to keep the lever 112 in an expanded position. To activate the tightening mechanism 104, an operator applies a force to the lever 112, thereby compressing the spring 116. A first end 132 of the lever 112 is operably coupled to the tightening mechanism 104 and a second, opposite end 136 of the lever 112 is rotatably coupled to the housing 14 at a pivot point 140. As shown in FIG. 5, the trigger assembly 38 may be pumped (as indicated by the arrow) so that the second end 136 of the lever 112 pivots about the connection point 140 of the housing 14, causing the first end 132 of the lever 112 to activate (e.g., engage, push, move, urge, trigger) the tightening mechanism 104. When the trigger assembly 38 is released, the spring 116 returns the lever 112 back to its initial position. So configured, an operator may pump the trigger assembly 38 with one hand to activate the tightening mechanism 104 and decrease the dimension D of the opening 50 of the closed loop 46 of the suture 22.

Figure 6:
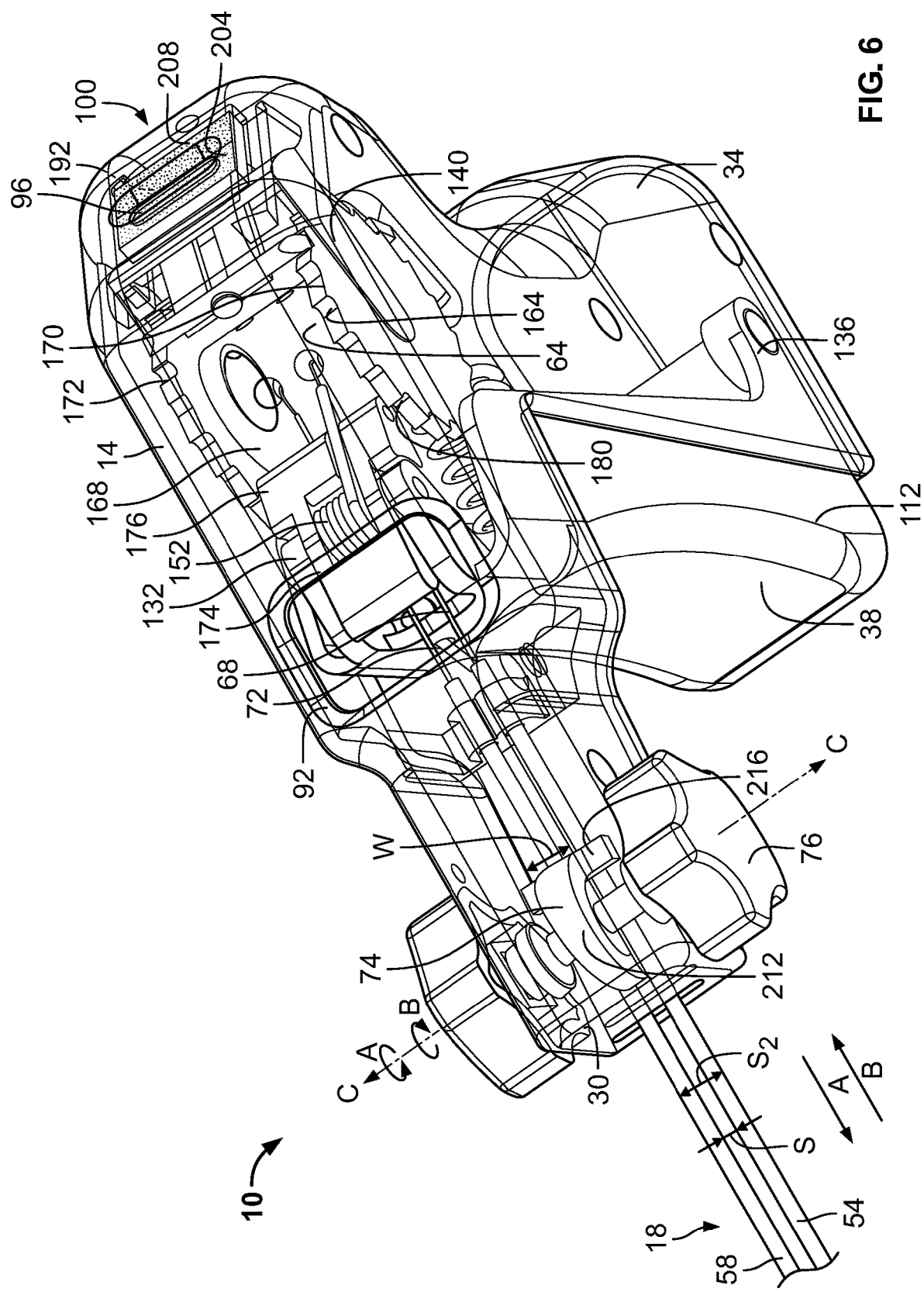
FIG. 6 is a partial, top perspective view of the device of FIG. 1, showing the components disposed in the housing.

Returning to FIG. 4, the tightening mechanism 104 is a ratchet assembly operably coupled with the trigger assembly 38 and disposed in the housing 14. The ratchet assembly 104 includes a drum 140, a first pawl 148, a first pawl spring 152, a second pawl 156, and second pawl spring 160. The drum 140 includes a plurality of teeth 164 circumferentially arranged about a cylindrical body 168. As shown in FIG. 6, the drum 140 includes first and second parallel ends 170, 172 defining the plurality of teeth 164 and the cylindrical body 168 extending between the first and second sides 170, 172. The string 64 (i.e., each of the first and second portions 68, 72) is fastened to the cylindrical body 168 such that as the drum 140 rotates in a direction B (clockwise in FIG. 4), the drum 140 pulls the string 64 of the suture 22 around the cylindrical body 168, thereby tightening the closed loop 46 of the suture 22. More specifically, the first and second portions 68, 72 of the string 64 pull on the first and second loops 80, 84 of the closed loop 46. The first and second pawls 148, 156 each engage a parallel tooth of the first and second sides 170, 172 of the drum 140. For example, the first pawl 176 engages a tooth defined in the first side 170 and a tooth defined in the second side 172. The following description of the engagement between the first and second pawls 148, 156 with the drum 140 will refer to one or a different "tooth," where the "tooth" may include a tooth from each of the parallel first and second sides 170, 172. However, in another arrangement, the drum 140 may be configured differently so that the first pawl 148 only engages one tooth of one side 170, 172, or one tooth extending from another location of the drum 140.

The first pawl 148 of the ratchet assembly 104 includes a first end 174 coupled to the first end 132 of the lever 112 and an opposite, second end 176 operably coupled with one tooth of the plurality of teeth 164 of the drum 140. The second end 176 of the first pawl 148 engages a receiving portion of a tooth of the plurality of teeth 164. In this example, a pin 180 attached to the pawl 148 engages with a receiving portion of the tooth. The pin 180 may be integrally formed or separately connected to the pawl 148. The first pawl spring 152 is coupled to and energizes the first pawl 148 to keep the pin 180 engaged with the drum 140 and to keep the suture 22 in tension. The first pawl spring 152 engages the handle 112, as shown in FIG. 4, and the drum 140, as shown in FIG. 6. In FIG. 6, the first pawl spring 152 is disposed through an opening in the first pawl 148 and a portion of the first end 174 of the first pawl 148 is accessible through the first window 92. When the lever 112 is compressed, the first pawl 148 causes the drum 140 to rotate in direction B (clockwise in FIG. 4) to wind the suture around the drum 140. The tension of the ratchet assembly 104, and therefore the tension in the suture 22, may be reset by pressing the first end 174 of the first pawl 148, thereby releasing the pin 180 from the teeth of the drum 140. In other examples, the housing 14 may not include the first window 92, and the ratchet assembly 104 is therefore enclosed by the housing 14.

In FIG. 4, the second pawl 156 includes a catch 184 that operably couples with a tooth of the plurality of teeth 164 of the drum 140, and is energized by the second pawl spring 160. The second pawl spring 160 engages an inner surface of the proximal end 188 of the housing 14 and the protrusion 128 of the grip 34. The second pawl spring 160 biases the second pawl 156 so that the catch 184 engages the teeth of the drum 140 as the drum 140 rotates in direction B. The catch 184 is an angled surface that engages a receiving portion of a tooth of the drum 140 to keep the drum 140 from slipping and rotating in direction A (counterclockwise in FIG. 4). In another arrangements of the tightening assembly 104, the first and second pawls 148, 156 and first and second pawl springs 152, 160 may be arranged so that they create a different ratcheting assembly.

The tightening mechanism 104 is arranged to transfer a tensile force to the closed loop 46 of the suture 22 by incrementally winding the string 64 (e.g., the first and second portions 68, 72) of the suture 22 around the drum 140. The ratcheting assembly 104 applies a force to the closed loop 46 of the suture 22 that is approximately the same or similar force of an average adult manually tying a knot without restriction (i.e., not restricted in surroundings or barriers in proximity to the knot). The spring constant of one or more of the first and second pawl springs 152, 160 is configured to enable the tightening mechanism 104 to apply a target tensile force to the suture 22. In one exemplary arrangement, the tightening force generated by the tightening mechanism 104 is in a range of approximately 3 lbf to approximately 6 lbf or a range of approximately 4 lbf to approximately 5.5 lbf. The tightening force generated by the tightening mechanism 104 varies depending on one or more of the pre-compression of the pawl springs 152, 160, location of the springs 152, 160, diameter of the drum 140, angle of the coefficient of friction of the catch 184, frictional losses in the system, and/or length of the pawls 148, 156. If one of or more of these or other factors changes, then the spring constant of the springs 152, 160 may also change. In one example, each pawl spring 152, 160 includes a spring constant k in a range of approximately 1.3 lbf-in/rad to approximately 1.4 lbf-in/rad, and in one example, 1.36 lbf-in/rad. However, in other examples, the one or more of the first and second pawl springs 152, 160 may have a different spring constant k to generate a different tightening force that is less than approximately 3 lbf or greater than approximately 6 lbf.

Generally speaking, when the lever 112 is pumped (i.e., when the lever is compressed as shown in FIG. 5), the lever 112 pivots about the connection point 140 of the grip 34 and the first end 132 of the lever 112 biases the first pawl spring 152 to move the first pawl 148 in engagement with a tooth of the plurality of teeth 164 of the drum 140. A single pump of the lever 112 can cause the drum 140 to rotate a first increment in the direction B (e.g., clockwise in FIG. 4) and wind the suture 22 around the drum 140. The catch 184 of the second pawl 156 engages a different tooth of the drum 140 to hold the drum 140 in this new position, maintaining the string 64 wound around the drum 140 by the first increment. This pumping action is repeated until the tightening mechanism 104 applies a maximum tensile force to the suture 22, or until the tension in the string 64 is equal to or greater than the spring force in the second pawl spring 160. When the tension in the suture 22 reaches this threshold, the force in the suture 22 overcomes the spring force of the second pawl spring 160, causing the second pawl 156 to slip, incrementally, relative to the plurality of teeth 164 of the drum 140, and in a direction A opposite the direction B. In other words, the string 64 causes a torque in the drum 140 that is greater than the restraining torque provided by the spring 160 in the second pawl 156. This torque causes the drum 140 to slip by the catch 184 in the second pawl 156 onto the previous tooth, which then maintains the tension in the string 64 at the maximum desired value. Put differently, the tightening mechanism 104 does not permit the suture to be tightened past a predetermined force.

In FIG. 4, the string 64 extends from the arm assembly 18 into the interior cavity 108 of the housing 14 and is secured to the drum 140. In particular, the string 64 is disposed below (relative to the orientation of FIG. 4) so that the movement of the lever 112 and movement of the first pawl 148 does not interfere with the tensioning of the string 64. As shown in FIG. 6, the string extends through the housing 14, passes the first window 92, and is secured to the cylindrical barrel 168 of the drum 140. The first window 92 is disposed between the drum 140 of the ratchet assembly 104 and the distal end 30 of the housing 14.

The indicator assembly 100 is operably coupled to the tightening mechanism 104 to communicate to an operator whether a maximum threshold of tension in the suture 22 has been met. In FIG. 4, the indicator assembly 100 includes a slide 192, a track 196, and a leaf spring 200, and is activated when the drum 140 slips and rotates in the A direction. The slide 192 and leaf spring 200 are movable together along the track 196 between a first position and a second position spaced from the first position. As shown in FIG. 6, the slide 192 includes a first signal 204 and a second signal 208 disposed below (i.e., adjacent and on the right-side in FIG. 6) the first signal 204. In one example, the first signal 204 may be a first color, and the second signal 208 may be a different color than the first color. The visual signals 204, 208 of the slide 192 may be arranged to display a different visual signal, for example, shapes, patterns, text, etc. that slide into view through the second window 96 to communicate the status of the suture 22 to the operator. Additionally, the visual signals 204, 208 may provide more than two indicators, and instead may include a color gradient to signify a more specific movement or status of the suture 22. While the indicator assembly 100 of the device of FIGS. 1-3 communicates through visual signals, other arrangements of the device may include audible indicators (e.g., click, snap, beep) or physical indicators (e.g., lock-up, disengage) when the closed loop cannot be tightened further.

When the indicator assembly 100 is in the first position, the slide 192 is disposed at a lower end of the track 196 so that a first signal 204 (FIG. 6) aligns with the second window 96 of the housing 14. In the first position, the first signal 204 communicates that a spring force of the ratchet assembly 104 is greater than a force applied to the suture 22 and that the more tension may be added to the suture. As the drum 140 rotates in the B direction, the leaf spring 200 flexes with the curvature of the teeth 164 and catches on a receiving portion of a different tooth with each incremental rotation of the tightening mechanism 104. In the example shown in FIG. 4, the leaf spring 200 is disposed between the first and second pawls 148, 156. When the indicator assembly 100 is in the second position, the spring force of the ratchet assembly 104 is equal to or less than the force in the suture 22 causing the drum 140 to slip and rotate in the A direction. As the drum 140 slips, the tooth engaging the leaf spring 200 pulls the slide 196 along the track 196, moving the first signal 204 out of alignment with the second window 96. The second signal 208 aligns with the second window 96, thereby communicating that the maximum tension force threshold is met and that no more tension may be added to the suture 22. In the second position, the slide 192 is disposed at a higher end of the track 196.

Figure 7:
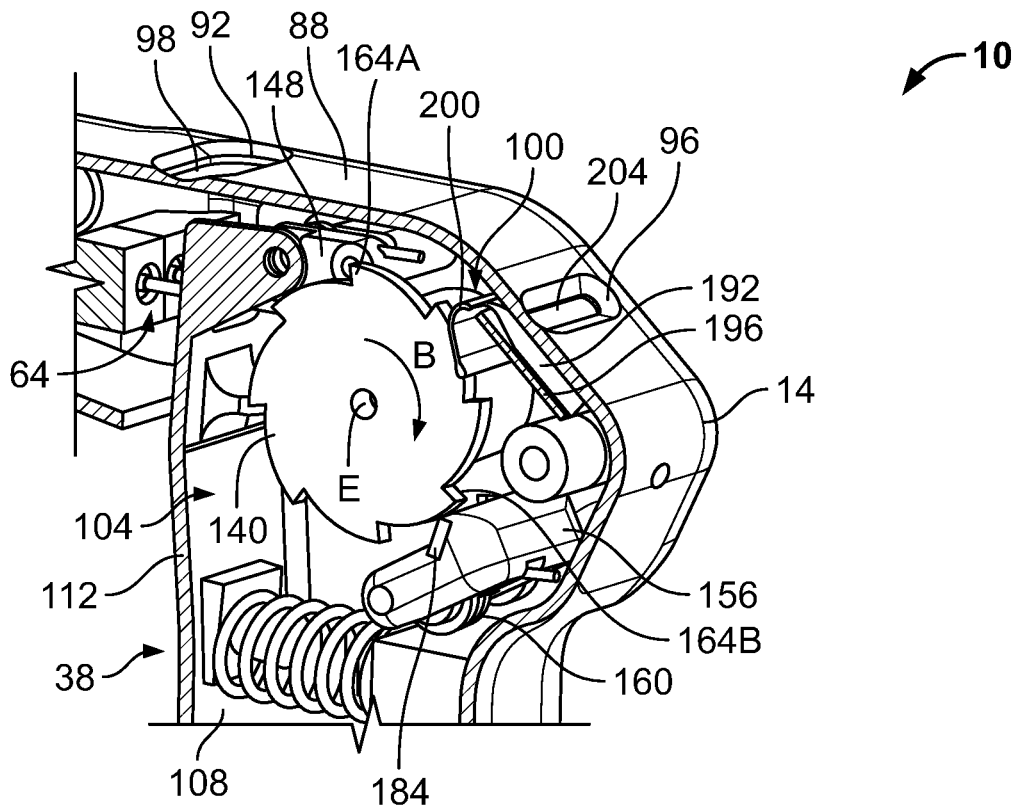
FIG. 7 is a partial cross-sectional view of the device of FIG. 1, showing the lever in a compressed position and the ratchet assembly in a first position.
Figure 8:
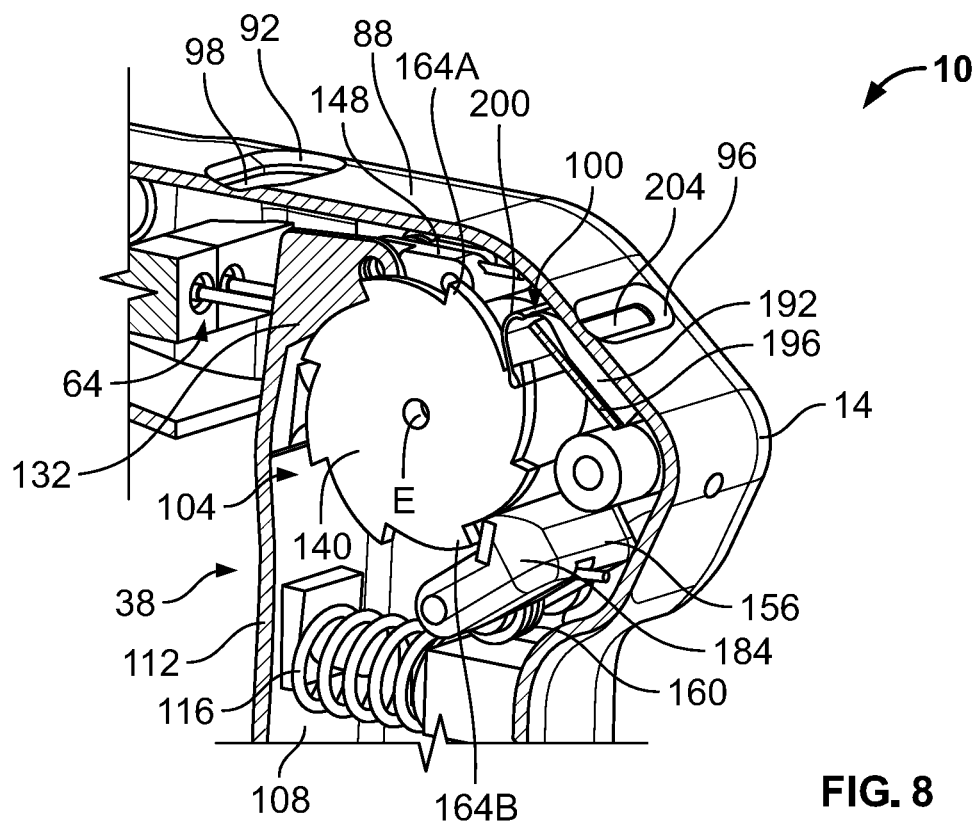
FIG. 8 is a partial cross-sectional view of the device of FIG. 1, showing the ratchet assembly in a second position.
Figure 9:
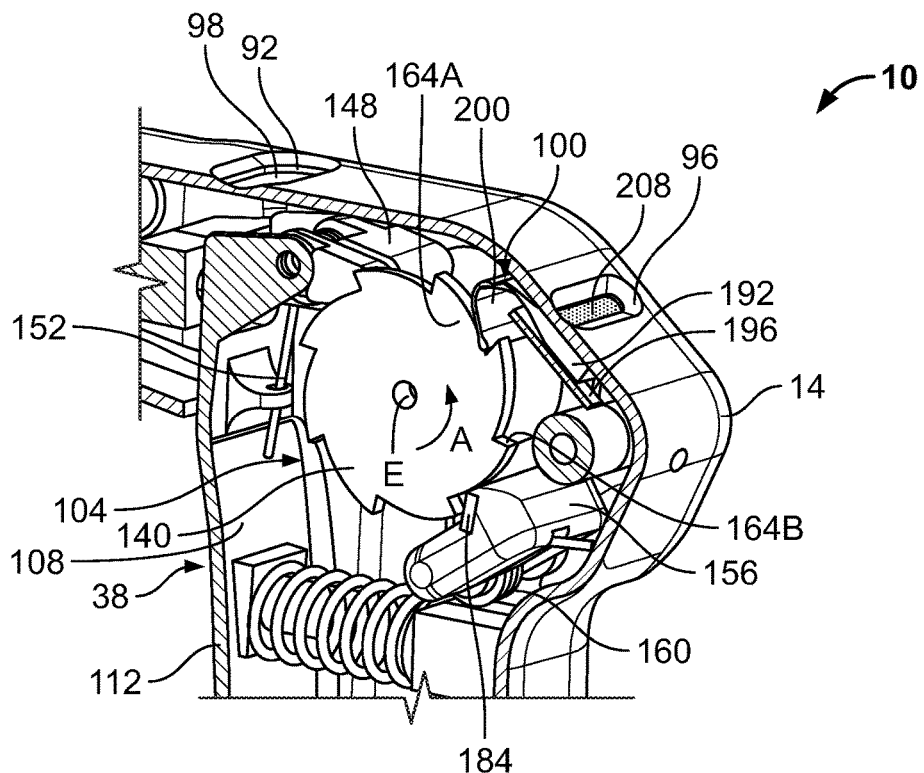
FIG. 9 is a partial cross-sectional view of the device of FIG. 1, showing the ratchet assembly in a third position.

Turning to FIGS. 7-9, the device 10 is illustrated in different stages of use. In FIG. 7, the lever 112 compresses the first spring 116 after being activated (i.e., pumped), causing the first end 132 of the lever 112 to bias the first pawl 148 and rotate the drum 140 in the direction B about the E axis. The pin 180 (hidden from view) of the first pawl 148 engages with a first tooth 164A to rotate the drum 140 until the catch 184 of the second pawl 156 receives a second tooth 164B. FIG. 8 illustrates the lever 112 fully compressed and the drum 140 rotated in the direction B by a first increment. In this position, the catch 184 of the second pawl 156 engages the second tooth 164B of the drum 140 to keep the drum 140 from rotating in the A direction. In FIGS. 7 and 8, the indicator assembly 100 is in the first position and the slide 192 is disposed at a lower end of the track 196, aligning the first signal 204 with the second window 96. After pumping the lever a final time, as shown in FIG. 9, the tension in the suture 22 overcomes the spring force of the second pawl 156, causing the second pawl 156 to disengage from the second tooth 164B of the drum 140, permitting the drum 140 to rotate in the A direction about the E axis. As the drum rotates 140 in the A direction, the leaf spring 200 of the indicator assembly 100 catches onto a third tooth 164C, and moves the slide 192 to a higher end of the track 196 and in the second position. In the second position, the indicator assembly 100 exposes the second signal 208 through the second window 96 of the housing 14.

Turning back to FIG. 6, the movable spacer 74 of the arm assembly 18 is illustrated. As previously discussed, the movable spacer 74 is disposed between first and second arms 54, 58 of the arm assembly 18. The spacer 74 includes a ramped drum 212 having a variable width W, in which a widest portion of the spacer 74 is connected to a stop 216 extending from the drum 212 to prevent further rotation of the spacer 74. When the first and second arms 54, 58 are spaced apart at a maximum space S2, the stop 216 has rotated 180 degrees from a position shown in FIG. 6 to a position where the stop 216 engages the first and second arms closer to the distal end 30 of the housing 14. To widen the space S between the first and second arms 54, 58, the knob 74 is rotated in the A direction, thereby gradually disposing the wider portion of the drum 212 between the first and second arms 54, 58 until the stop engages the arms 54, 58 and to minimize further rotation of the spacer 74 in the A direction. To narrow the space S between the first and second arms 54, 58, the knob 74 is rotated in the B direction. In other arrangements, the spacer 74 may be configured to increase the space S between the arms 54, 58 by rotating the movable spacer 74 in the B direction. In yet another example, the movable spacer 74 may move linearly, rather than rotationally, relative to the arm assembly 18 to widen and narrow the space S between the arms 54, 58.

Figure 10:
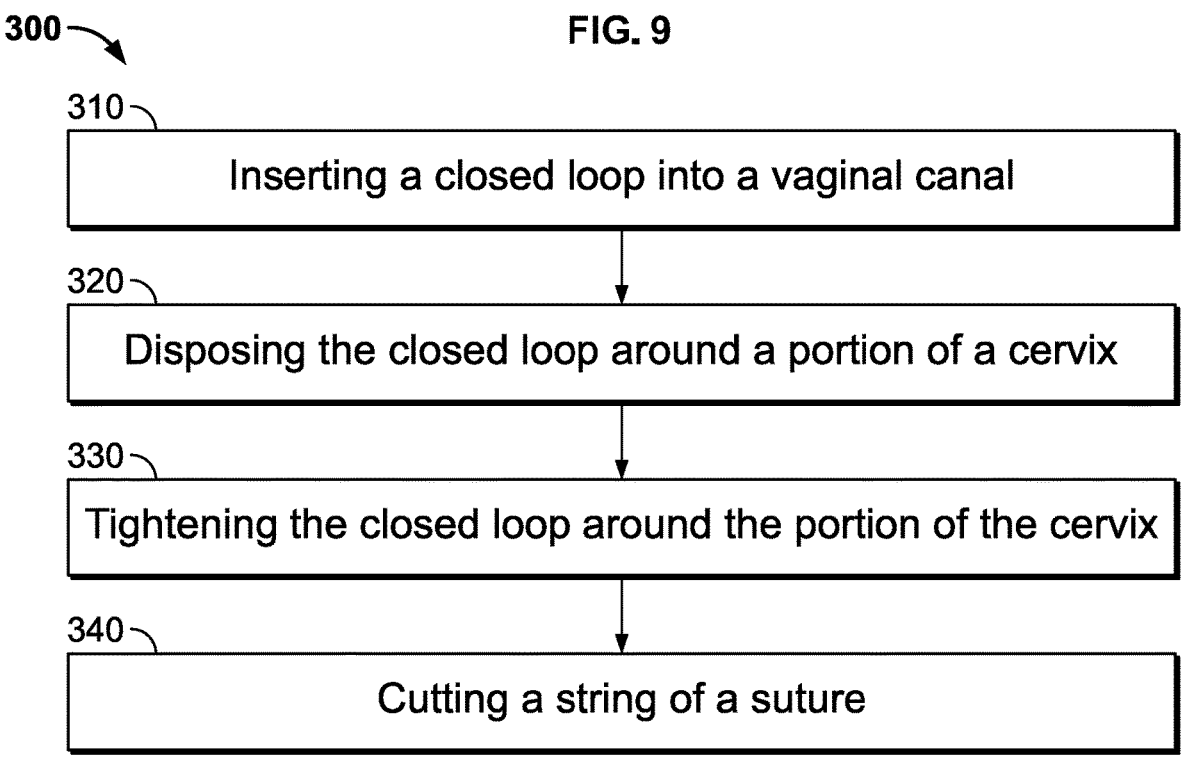
FIG. 10 is a schematic diagram of a method of delivering a noninvasive suture to a cervix.
Figure 11:
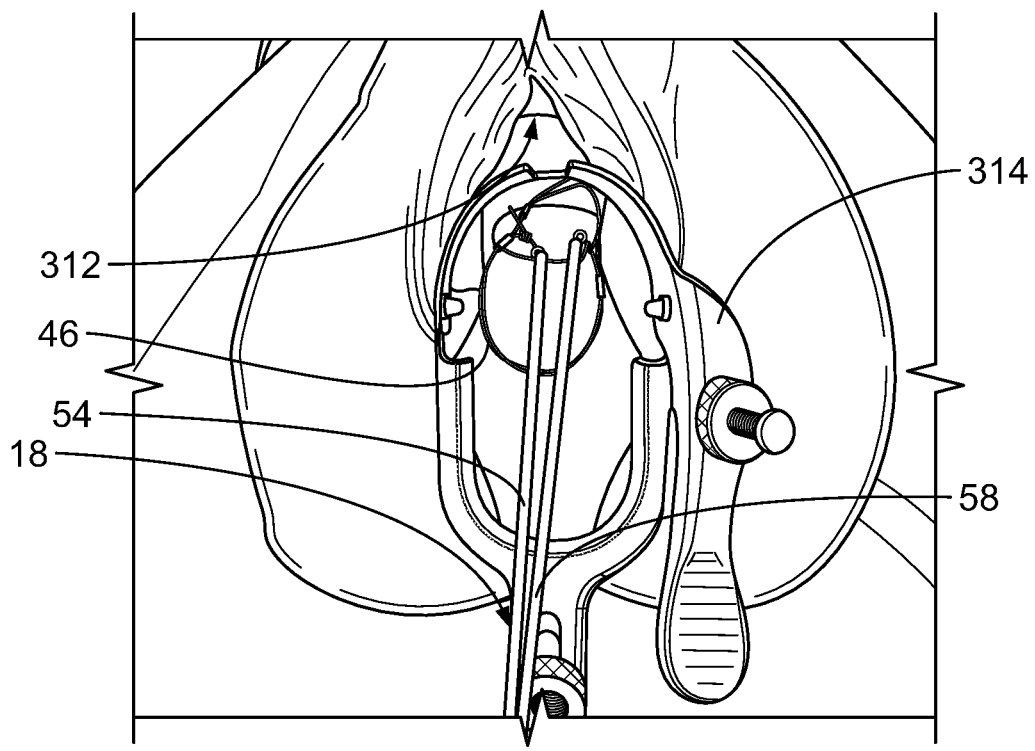
FIG. 11 is a partial view of the device of FIG. 1 inserted into an anatomical model of a vaginal canal.
Figure 12:
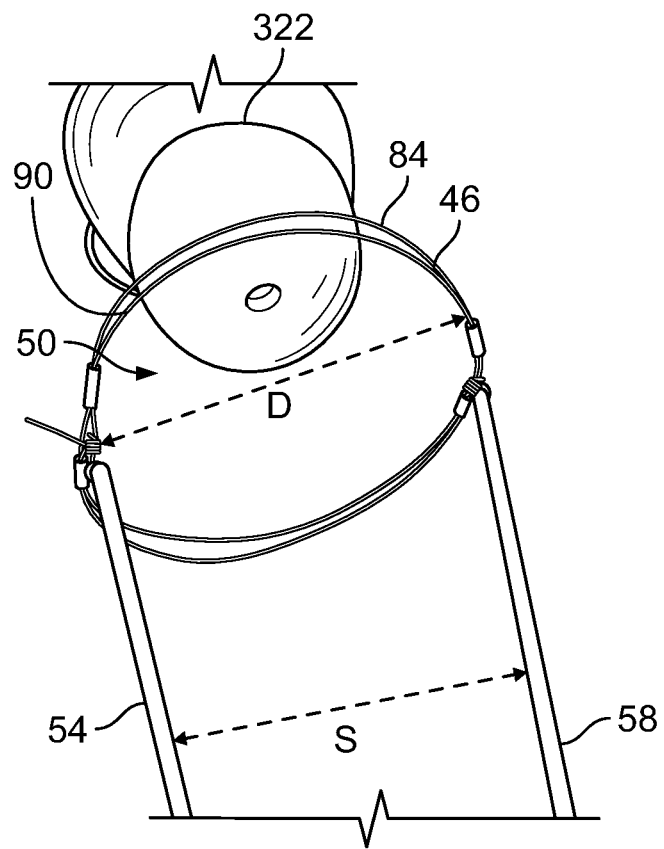
FIG. 12 is a partial view of the device of FIG. 1 placed around an anatomical model of a cervix.
Figure 13:
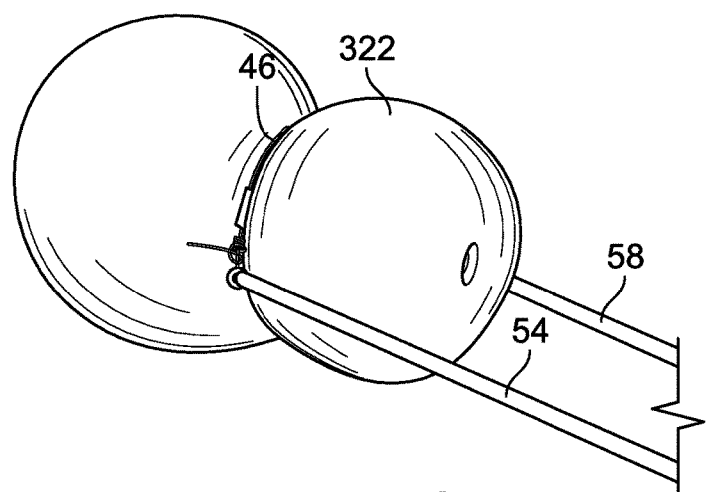
FIG. 13 is a partial view of the device of FIG. 1 delivering a noninvasive suture to the anatomical model of the cervix.

A flow chart representative of an example method 300 for delivering a noninvasive suture 22 around a portion of a cervix is shown in FIG. 10. The example method 300 illustrated in FIG. 10 may be performed with the device 10 of FIGS. 1-9, and is described with reference to the chronological sequence shown with anatomical models of FIGS. 11-13. A first step of the method 300 includes inserting 310 a closed loop 46 into a vaginal canal 312, as shown in FIG. 11. To facilitate insertion, an operator may use a speculum 314 to widen the vaginal canal 312. As shown in FIGS. 10 and 12, the method 300 includes disposing 320 the closed loop 46 around a portion of a cervix 322. In FIGS. 10 and 13, the method 300 includes tightening 330 the closed loop 46 around the portion of the cervix 322. Finally, the method 300 includes cutting the string 64 of the suture 22. This may include, for example, cutting the first and second portions 68, 72 of the string 64 through the first window 92 of the housing 14. Once the string 64 of the suture 22 is cut, the device 10 may be removed from the vaginal canal 312, and the string 64 may be further trimmed.

Inserting 310 the closed loop 46 includes inserting a portion of the first arm 54 and the second arm 58 of the arm assembly 18 into the vaginal canal 312, as previously described. The first arm 54 is operably coupled to the first loop 80 of the closed loop 46 and the second arm 58 is operably coupled to the second loop 84 of the closed loop 46. Once the closed loop 46 is disposed in the vaginal canal 312, the operator may move the spacer 74 of the arm assembly 18 to widen the dimension D of the closed loop 46. In FIG. 1, the dimension D decreases (i.e. vertical axis of the closed loop 46), and the dimension of the width (perpendicular to D) increases. In FIG. 12, as the arm assembly 18 moves apart, the dimension D (i.e., the horizontal dimension of the closed loop 46) increases and the vertical dimension of the closed loop 46 decreases. This step includes changing a space S between the first arm 54 and the second arm 58 by moving the spacer. In the example of FIGS. 1-9, the operator may rotate the knob 76 to move the spacer 74 disposed in the housing 14. To tighten 330 the closed loop 46, an operator may pull one or more of the first and second portions 68, 72 of the suture 22 to decrease the dimension D of the closed loop 46. As previously described, the operator may tighten the closed loop 46 by activating the trigger assembly (i.e., compressing the lever 112) until a maximum tensile force in the suture 22 is met. In this example, both portions 68, 72 are tightened together, however, in another example, the tightening mechanism may be configured to tighten each portion 68, 72 separately. The indicator assembly 100 communicates to the operator that the maximum tensile force transferred to the suture 22 is met.

Figure 14:
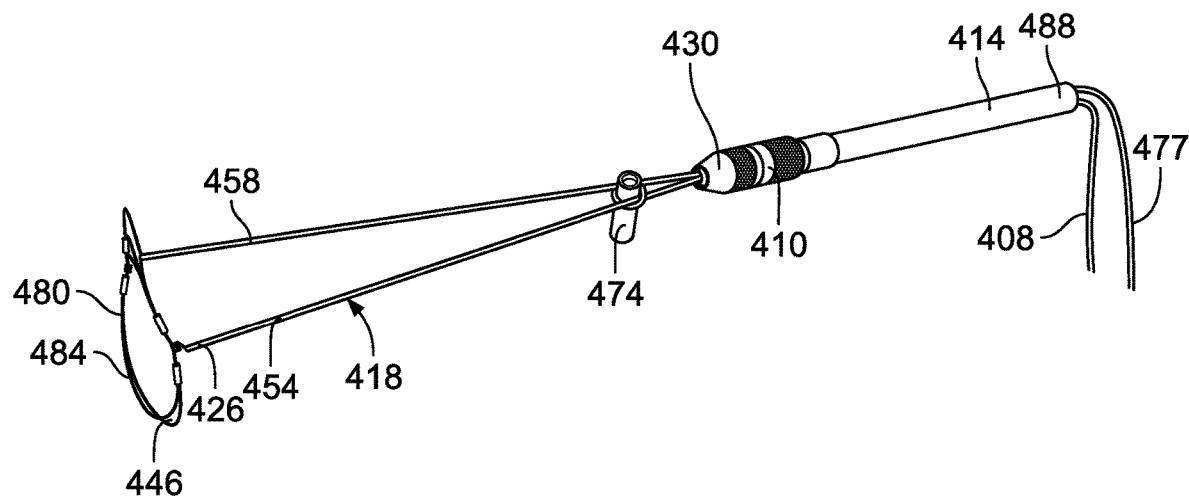
FIG. 14 is a side perspective view of a different noninvasive suture delivery device assembled in accordance with the teachings of the present disclosure.

The method 300 of FIG. 10 may be performed using a different hand held noninvasive suture device, such as a second example device 410 illustrated in FIG. 14. In this example, the device 410 is similar to the first example device 10 described above with reference to FIGS. 1-9, with similar reference numerals used for similar components, although the reference numerals are increased by 400. A closed loop 446 and arm assembly 418 of the second example device 410 operates in a similar manner as the closed loop 46 and arm assembly 18 of the first example device 10. However, the second example device 10 differs from the first example device 10 in the manner discussed below.

The device 410 of FIG. 14 includes a handle 414, an arm assembly 18 coupled to a distal end 430 of the handle 414, and a closed loop suture 446 extending from a distal end 426 of the arm assembly 418. The handle 414 includes a pen-shaped housing 414 and does not include a tightening mechanism. The arm assembly 418 includes first and second arms 454, 458, and a movable spacer 474. The movable spacer 474 is a wedge movably fastened between the first and second arms 454, 458 to increase and decrease a space between the first and second arms 454, 458. The wedge 474 is a cylindrical peg that may be manually moved toward or away from the distal end 426 of the arm assembly 418 in order to change a dimension of the closed loop 446. Unlike the device of FIGS. 1-9, the suture is tightened in a different manner. For example, first and second portions 468, 472 corresponding to first and second loops 480, 484 extend through the first and second arms 454, 458, respectively, and through a distal end 488 of the housing 414. To tighten the closed loop 446, an operator may pull the first and second portions extending from the housing 414. Once the suture is in place around a portion of the cervix, the operator may cut the strings 468, 472 at the proximal end 488 of the handle.

Figure 15:
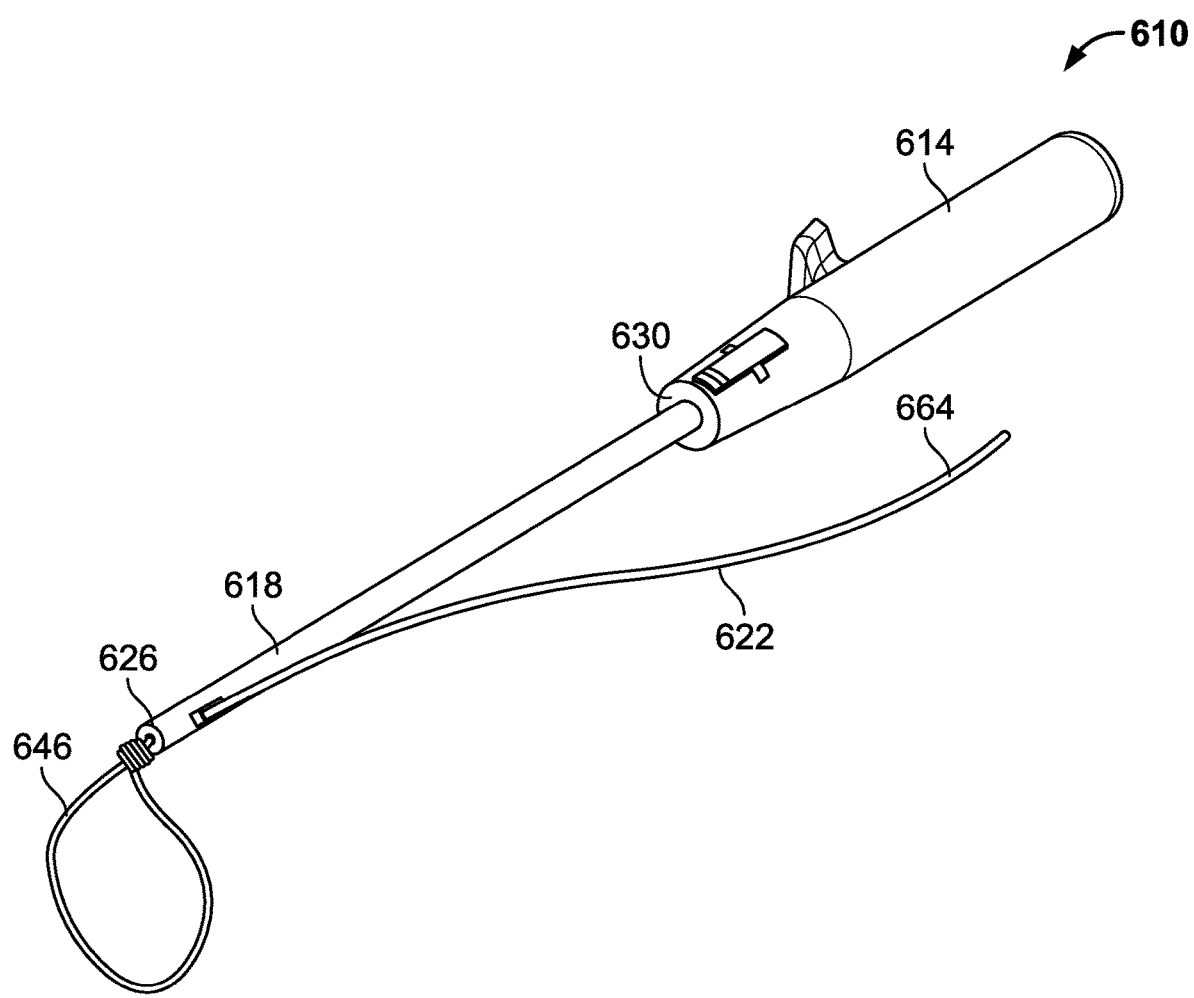
FIG. 15 is a perspective view of yet another noninvasive suture delivery device assembled in accordance with the teachings of the present disclosure.

The steps of FIG. 10 may also be achieved using other examples of suture delivery devices. A third example noninvasive suture device (a single suture knot device) 610, e.g., as shown in FIG. 15, can be used as a deployment system to introduce a suture loop with a pre-tied knot over the cervix, tighten loop, and trim free ends of the suture. In this example, the device 610 is similar to the second example device 410 described above with reference to FIG. 14, with similar reference numerals used for similar components, although the reference numerals are increased by 200. A closed loop 646 and arm assembly 618 of the third example device 610 is tightened manually by pulling the suture 622.

Figure 16:
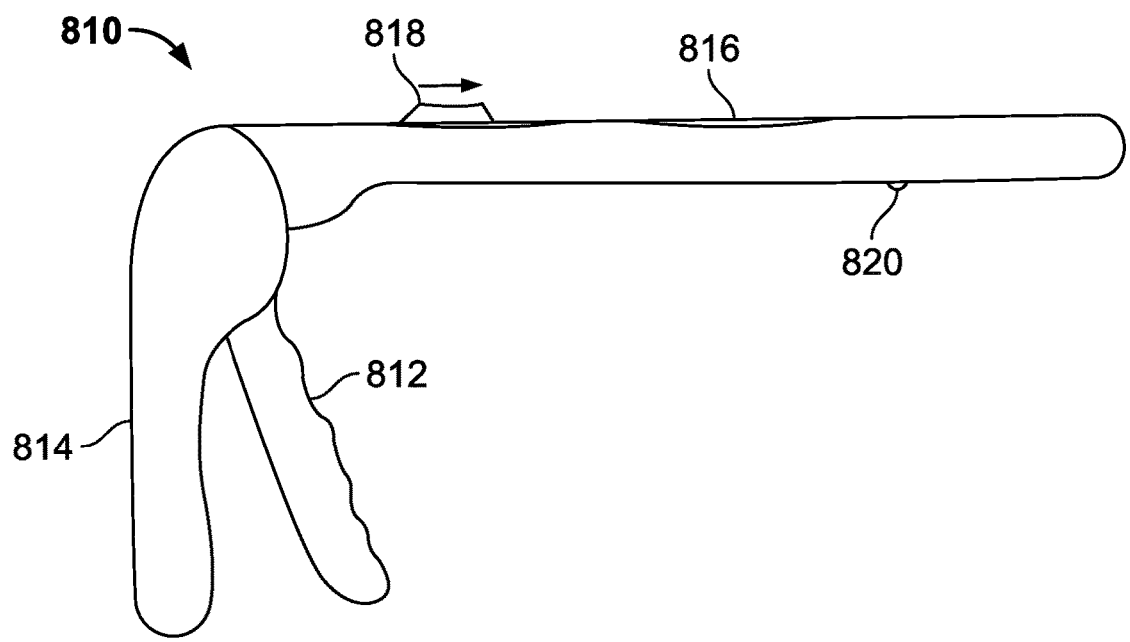
FIG. 16 is a side elevation view of another noninvasive suture device in accordance with the teachings of the present disclosure, showing the device in a stowed state.
Figure 17:
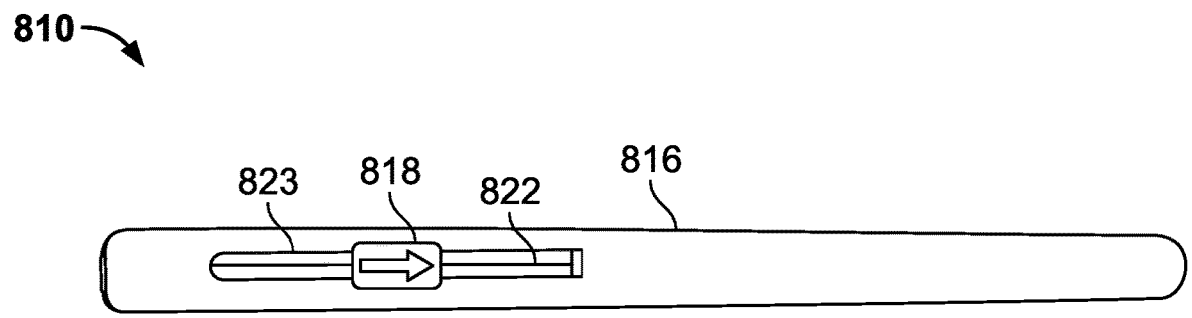
FIG. 17 is a top plan view of the device of FIG. 16.
Figure 18:
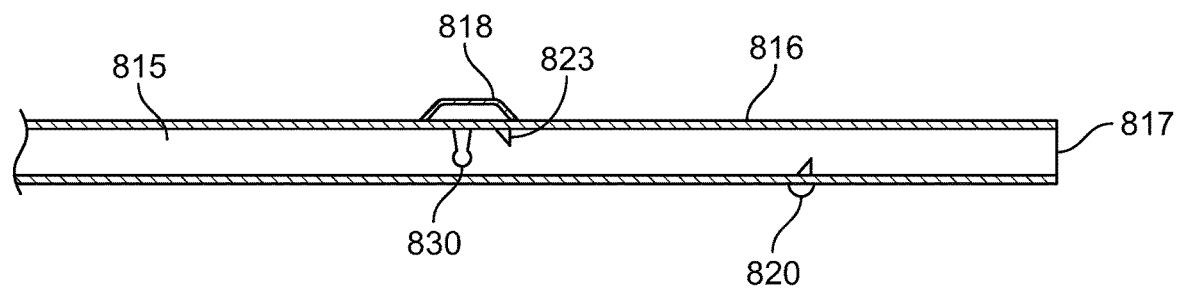
FIG. 18 is a partial cross-sectional view of the device of FIG. 16, shown without a suture.

Referring to FIGS. 16 and 17, a cervical suture deployment device 810 includes a handle 814 and an elongated member 816 extending from the handle 814. The elongated member 816, also referred herein as an "arm" or "cannula arm," is configured to be inserted through a speculum into the vagina for use in a cervical cerclage procedure, for example. Referring additionally to FIG. 18, the elongated member 816 includes a lumen 815 or bore there through and a distal opening 817.

Figure 19:
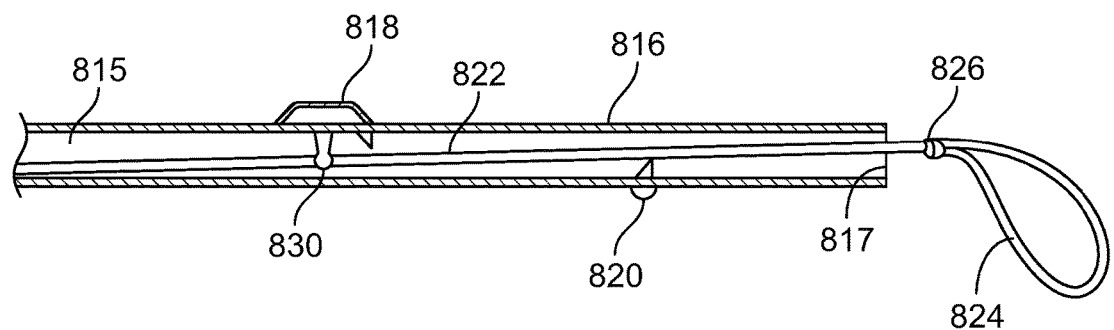
FIG. 19 a partial cross-sectional view of a portion of the device of FIG. 16, schematically showing an example of a suture disposed therein in a deployed state.

Referring additionally to FIG. 19, a suture 822 is disposed at least partially in the lumen 815 and attached to the handle 814 (of FIG. 16) to be pulled by the handle 814 (of FIG. 16) relative to the elongated member 816. The suture 822 can include any suitable material known in the art, for example, a non-absorbable material such as mersilene, silk, cotton, elastic, nylon, rubber, plastic, polypropylene.

In certain examples, the suture 822 includes a preformed loop 824 at a distal end of the suture 822. The preformed loop 824 is configured to be deployed through the distal opening 817 of the elongated member 816. The preformed loop 824 is sized to surround a cervix of a patient in a loose state (e.g., as shown in FIG. 19) and is configured to tighten around the cervix when pulled by the handle 814 to a tightened state.

The device 810 can include a deployment mechanism 818 operatively connected to the elongated member 816 and the suture 822 to deploy the suture 822 through the distal opening 817. In certain embodiments, the deployment mechanism 818 can be a slider configured to slide relative to the elongated member 816. The slider can be disposed in a rectangular opening 823 along elongated member 816 for example to allow the slider to slide therein to advance the suture 22.

The deployment mechanism 818 can include any suitable structure to guide and/or act on the suture 822 to push the suture 822 distally. For example, the deployment mechanism 818 can include a loop portion 830 for guiding the suture 822 within the lumen. The loop portion 830 can be configured to push the suture 822 distally, but to allow the suture 822 to slide relative to the loop portion 830 when pulled proximally.

In certain examples, the deployment mechanism moves the distal suture forward not just the preformed loop as there is slack in elongated member. In another variation the preformed loop is already deployed (already out) when device is opened from packaging. The tightening mechanism is separate from the deployment. The tightening mechanism is within the handle. In an example, the deployment mechanism is attached to the suture so when slid forward it pushes distal suture out front opening until the slack is completely gone. When using tightening mechanism in handle the deployment mechanism may be seen to slide back toward the original position as suture is tightened.

In certain examples, the suture 822 may be housed in a substantially rigid body to facilitate placement of the suture and/or suture loop 824.

In one example, the pre-formed knot 826 is outside the elongated member 816 and the elongated member 816 has an opening that allows the suture 822 to pass, but is too small for knot 824 to pass. As tightening mechanism is employed suture 822 is pulled into the elongated member 816.

In certain examples, the preformed loop 824 can include a one-way slip tie 826 such that the preformed loop 824 can be tightened by proximally pulling the suture 822 (e.g., using the handle 814), but cannot be loosened. The slip tie 826 can include any suitable mechanism (e.g., tongue and groove style locking such as a zip tie), knot, or other components. The slip tie is designed to tighten the suture around the cervix and to thereby prevent or preclude dilation in order to treat "cervical insufficiency."

In certain embodiments, the suture 822 will comprise, e.g., an arbor knot. For example, first, a loop is made with suture crossing one another (free end crosses behind). Next, an overhand knot is thrown (free end is taken around the front and through original loop). The knot is made in free end of suture. As loose end of suture is pulled, the knot is tightened. A small plastic or metal circular fastener can be affixed to the free end of suture at the knot to secure the knot when suture 822 is pulled tight. The fastener will not allow suture to loosen substantially. The remaining loose end of suture may be removed by cutting).

The handle 814 can include an actuator or lever 812 operatively connected to the suture 822 to pull the suture 822 in any suitable manner with actuation of the lever 812. As shown in FIG. 16, the lever 812 can be forward of the handle 814. Any suitable handle assembly to pull and/or push the suture 822 is contemplated herein.

In certain examples, the device 810 can include a cutting mechanism 820 disposed on the elongated member 816 for cutting the suture 822. The cutting mechanism 820 can include a button actuator (and/or any other suitable device) disposed on an underside of the elongated member 816 for example. In such examples, pressing the button actuator can advance the cutting mechanism 820 to sever the suture 822. In certain examples, the slider 818 can also include a second cutting mechanism 823 (FIG. 19) disposed thereon extending into the lumen 815.

The device 810 and/or any portion thereof can be made of any suitable materials, for example, the elongated member 816, the handle 814, and the lever 812 can include a suitable plastic. Any other suitable materials are also contemplated herein.

The method can include deploying the preformed loop 824 of the suture 822 from a distal end of the elongated member 816 proximate the cervix. The method can include placing the preformed loop 824 of the suture 822 around the cervix. The method can include pulling the suture 822 (e.g., with a handle mechanism) to tighten the preformed loop 824 of the suture 822 around the cervix.

In certain examples, the method can include cutting the suture 822 at a predetermined length after tightening. The method can include cutting the suture 822 using a cutting mechanism disposed on the elongated member 816. Any other suitable cutting is contemplated herein.

The suture 822 can be placed just proximal to the vesicocervical junction and as posteriorly as possible on the inferior aspect of the cervix. In some examples, the handle can include a rotating member that the physician can roll using the lever to tighten and cinch down the already created slip tie 826. Once the suture 822 is securely in place, the device 810 can be removed and the remaining suture tail can be cut to an appropriate length (e.g., by the device 810 before removal or after remove manually). The suture 822 could be removed at 36 to 37 weeks to allow for a vaginal delivery or at the time of scheduled cesarean birth.

An embedded cutting mechanism within the arm can be engaged to clip the excess material after the suture is secured in place and a tension gauge ensures that the cerclage is secure before disengaging the medical device. This feature may be included in the first and second example devices described above.

In certain embodiments, the handle can include an indicator, e.g., a tension indicator, contained in the front of the handle. A tension indicator can be a spring based system which is tuned to a min/max force to be applied to the loop. It can give the user an indication that the loop is at the right tension. As shown, the tension indicator can be a transparent window wherein an inner sleeve moves backward along the main axis of the instrument, or any other suitable device. For example, when visual indicators align the suture loop is at the correct tension.

In certain embodiments, the handle can include an actuator lever/button configured to allow user to cut suture at distal tip and to simultaneously release the loop from the right side arm. Any suitable structure to cut the suture is contemplated herein. The handle can include a control (e.g., a slider or wheel) that allows user to spread arms apart or collapse them together to allow easier entry through the speculum.

The device can include a hollow cannula (e.g., thin walled stainless steel tube) which can act both as a longitudinal member and can house the mechanism(s) to cut the suture. The cannula can be approximately 5 mm in diameter, or any other suitable size. The cannula can include markings to indicate distance of loop over the cervix. In certain embodiments, the cannula can include an atraumatic tip, e.g., with a small hole (e.g., large enough for 2 suture strands). The device can include a suture, e.g., a monofilament suture. The suture can be tied into a loop, e.g., with a Pitzen or similar constricting knot creating a loop, and can include a knot and two approximately equal long ends about 8 inches long. In certain embodiments, the suture loop can be about 50 mm in diameter, or any other suitable size. The suture loop and the knot can be on distal end of device. Both free ends can be routed through a central hole in the tip and passed through the side of the device. One of the free ends of the suture can be marked at the end to pull to tighten.

The device can include a cutter, e.g., a tube inside the cannula. The cutter can have a rectangular window with the distal side of the rectangle sharpened, for example. Any other suitable shape is contemplated herein. For example, when the tube is pulled back by the actuator lever the cutter tube can move toward the handle cutting both ends of the suture.

In certain embodiments, the device can be provided with suture preloaded. The suture loop and cannula can be inserted into the vaginal canal, manipulating the loop over the cervix. In embodiments, flexibility of loop allows it to move through the speculum. A clinician can maintain control over the free ends of the suture while introducing the device. Using markings on the cannula, proper depth over the cervix can be visualized. The loop can then be tightened manually by pulling free ends of the suture while resisting force with the handle. When proper tension is indicated in the window, the clinician knows the loop can have sufficient tension. While holding free ends, the actuator lever can be pulled causing sutures to be cut. Device can then be withdrawn from vaginal canal.

Certain embodiments can include a handle (e.g., a screwdriver type grip that allows the user to grip and manipulate the device into the vaginal canal and place suture loop over the cervix).

The device can also include a loop expander (e.g., a hub or structure that connects left and right arms (cannula)). The loop expander can allow the user to spread or collapse arms depending on user input.

The device can include two cannulas (e.g., 3 mm in outer diameter, or any other suitable size) attached at a common point at the end of the handle. A first side (e.g., the left side cannula) can include a hollow cannula (e.g., thin walled stainless steel tube) which can act both as a longitudinal member and can house the mechanism(s) to cut the suture, and can include an atraumatic tip with a small hole (e.g., enough for 2 suture strands). The second side (e.g., the right side cannula) can include a hollow cannula which can act both as a longitudinal member and can house the mechanism(s) to release the suture loop. One or more of the cannula can include markings to indicate distance of loop over the cervix, for example.

The device can include a suture, e.g., a monofilament suture. The suture can be tied into a loop, e.g., with a Pitzen or similar constricting knot creating a loop, and can include a knot and two approximately equal long ends about 8 inches long. In certain embodiments, the suture loop can be about 50 mm in diameter, or any other suitable size. The suture loop and knot can be on the left arm of device. One of the free ends of the suture can be marked as the end to pull to tighten. The suture loop can be captured by the right cannula arm but suture can be free to slide as the loop is tightened.

The device can include a cutter, e.g., a tube inside the cannula. The cutter can have a rectangular window with the distal side of the rectangle sharpened, for example. Any other suitable shape is contemplated herein. For example, when the tube is pulled back by the actuator lever the cutter tube can move toward the handle cutting both ends of the suture.

Figure 20:
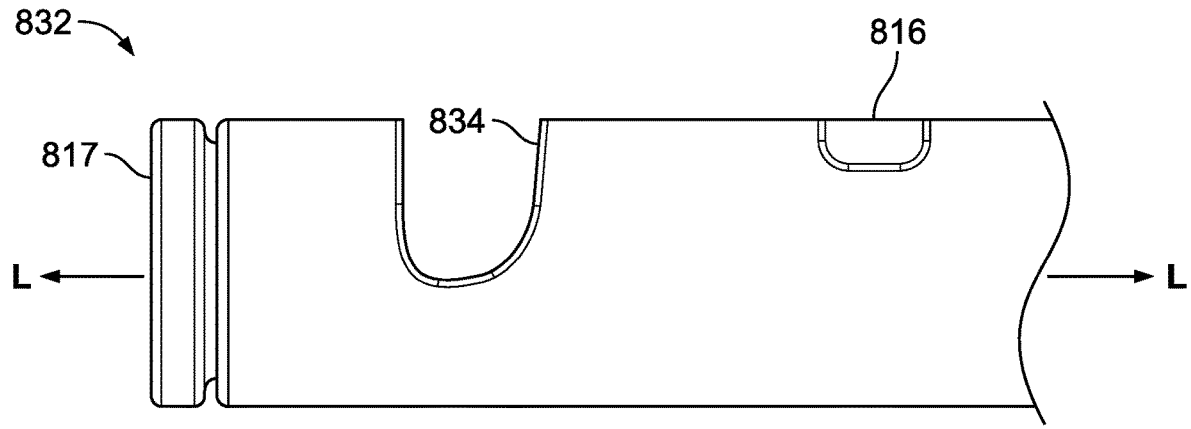
FIG. 20 is a side view of an example of a suture release for a noninvasive suture device assembled in accordance with the teachings of the present disclosure.
Figure 21:
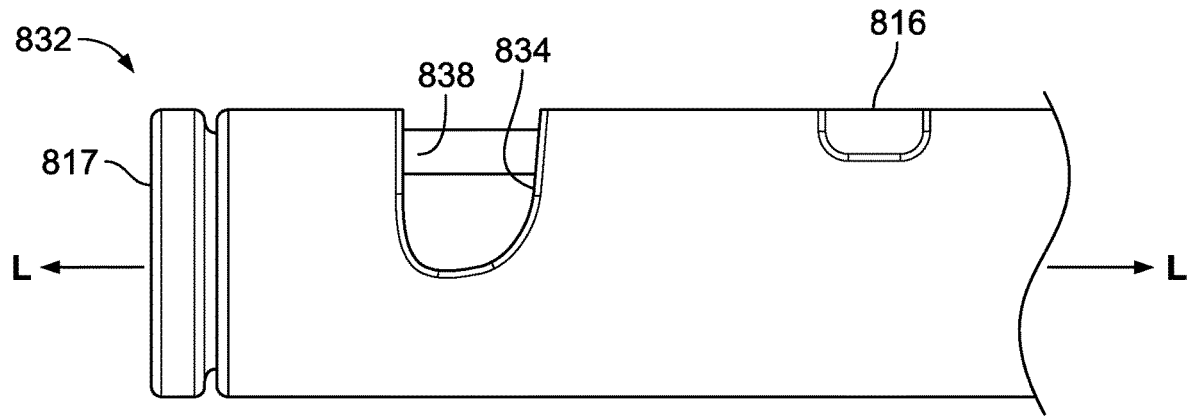
FIG. 21 is a side view the suture release of FIG. 20, showing a wire disposed in a cannula arm of a suture device.
Figure 22:
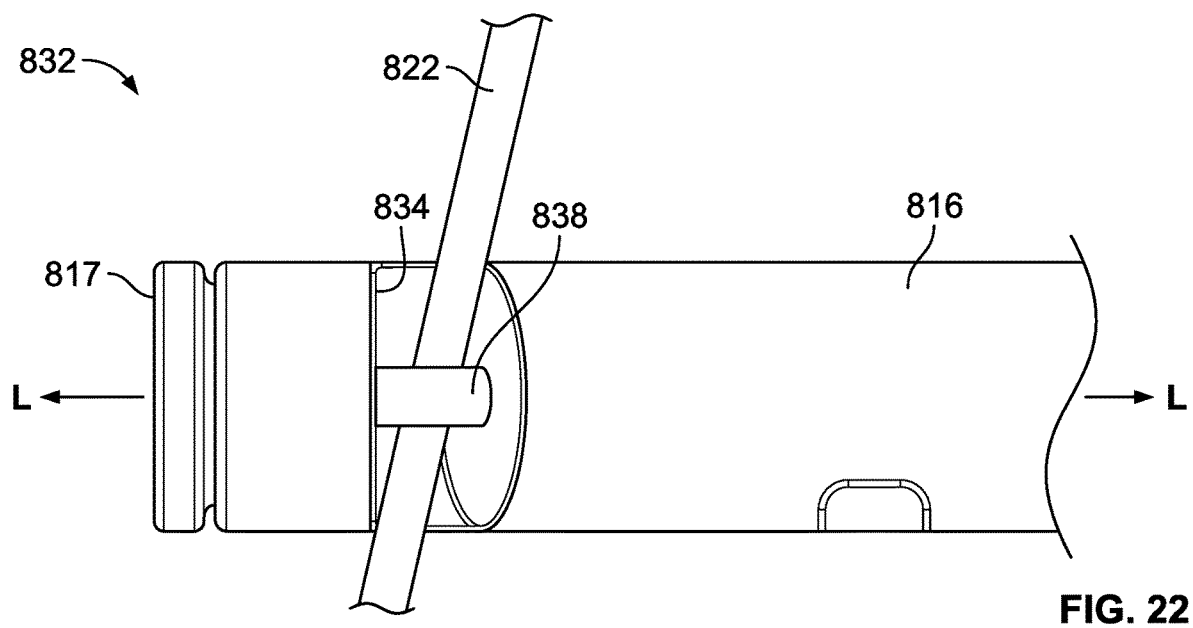
FIG. 22 is a top view of the suture release of FIG. 20, showing a suture trapped by the wire.

The devices described herein (e.g., one or more of the cannula, e.g., both) can include a suture release, such as the suture release of FIGS. 20, 21, and 22. The suture release can be a slot 834 oriented across a central axis of a cannula arm 816 as shown in FIG. 20. The slot 834 can have room for a suture to lie within its confines.

In FIG. 21, a wire or tube 383 slides along the axis of the cannula but contained with the cannula. In FIG. 22, a suture can be trapped by wire from releasing but is free to slide. When the wire is retracted the suture can be free to escape the slot.

Embodiments can be provided with the suture loop preloaded and attached to both arms. Device arms can be collapsed by moving handle slider forward. The suture loop and cannulas can be inserted into the vaginal canal. Device arms can be expanded by moving the handle slider backward. The loop can then be expanded and held open to more easily fit over the cervix. The clinician can maintain control over the free ends of the suture while introducing the device. Using markings on the cannula, proper depth over the cervix can be visualized.

The loop can then be tightened manually by pulling free ends of the suture while resisting force with the handle. When proper tension is indicated in the window, the clinician knows the loop has sufficient tension. While holding free ends, the actuator lever can be pulled causing sutures to be cut and the right arm wire can be retracted allowing suture loop to be released. The arms can then be collapsed and the device can be withdrawn from vaginal canal.

Any suitable combination(s) of any disclosed embodiments and/or any suitable portion(s) thereof are contemplated herein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The arms 54, 58, 454, 458, 658, 816 in the first, second, third, and fourth example devices 10, 410, 610, 810 are made of stainless steel or other material that permits flex without plastic deformation. The suture is made of a nonabsorbable material, such as, for example, linen, cotton, silk, stainless steel wire, polyamide (nylon), polypropylene (Prolene) and polyethylene (courlene). The clasps holding the concentric first and second loops 80, 84, 480, 484 may be polyetheretherketone (PEEK) tubing, polyamide (nylon), polypropylene (Prolene) and polyethylene (courlene), or other material having a long term mucosal membrane contacting biocompatible material. The devices may be single-use, or may be re-threaded with a pre-assembled closed loop for multiple-uses. The housing 14 and certain components of the trigger assembly 100 and tightening mechanism 104 may be formed using traditional methods, such as injection molding, or additive manufacturing techniques.

The noninvasive cervical cerclage delivery devices and method described herein advantageously provide a nonsurgical method for applying a cervical cerclage to reinforce a weakened (cervical insufficiency or cervical incompetence) or shortened cervix and avoid preterm births. In contrast to applying a surgical cervical cerclage, the disclosed devices allow delivery of a sufficiently tensioned suture around a portion of a patient's cerclage without piercing any tissue of the patient. The application of the cerclage using the disclosed techniques does not require the use of anesthesia, and therefore delivering the cervical cerclage can be completed in an entirely outpatient setting, greatly reducing surgical related risks for both the mother and fetus. This procedure may also be completed in more rural settings, providing access to cervical cerclage for those with limited access to adequate maternal fetal medical care.

The devices disclosed herein may be operated by a single practitioner. The handle of the devices provides an ergonomic grip, and the arm assembly permits accurate and noninvasive placement of the suture around a patient's cervix. The loop adjustment features may be easily operated by rotating a knob and pumping a spring-biased handle (or rotating handle). A practitioner can insert the device into a vaginal canal when the arm assembly is in a narrow position, and then widen the closed loop once the loop is disposed in the vaginal canal. This delay in widening the suture around the cervix facilitates insertion while also providing a more comfortable procedure to the patent. Once the suture is in place, the operator tightens the closed loop by a pumping motion, and never pierces the cervix for applying the cerclage.

The disclosed devices enable a practitioner to deliver a sufficient tensile force to the closed loop of the suture while the suture is placed over the cervix. Specifically, the devices deliver approximately 5 lbf to the closed loop, a force that is generally only possible by hand and with full range of motion. Delivery of this type of knot around the cervix was not possible by hand because of the spatial restrictions of the vaginal cavity.

The first example device also provides a built-in safety feature to ensure that the suture is not overtightened and/or cause damage to the target tissue. The indicator assembly of the first example device automatically triggers and sends a visible signal to the practitioner when a maximum force is applied to the suture. Even if the practitioner does not see the visible signal of the indication assembly, the tightening mechanism is configured so that the tightening mechanism cannot apply tension above a predetermined threshold to the suture. The visible indicator communicates to the practitioner to stop pumping the lever, and the built-in safety features of the tightening mechanism physically disengages to prevent accidental over-tightening of the suture.

Example devices described herein include noninvasive methods and devices for cervical cerclage placement. The suture placed by the device could be removed at 36 to 37 weeks of pregnancy to allow for a vaginal delivery or at the time of scheduled cesarean birth. This noninvasive cervical cerclage could be placed in an outpatient setting without need for anesthesia. The noninvasive cervical cerclage avoids the risks of an invasive approach while still supporting the pregnancy and keeping the cervix from opening or shortening prematurely. Examples described herein also reduce health care costs by moving this procedure to the outpatient setting and removing the need for general or regional anesthesia.

Example devices described herein offer noninvasive cerclage that can be the desired effective and safe intervention. Usually, a pregnant woman undergoes a second trimester ultrasound. At the time of this ultrasound, a cervical length can be performed. If the cervix is short, embodiments of a device and/or method as described above can be used to place a suture can at that same doctor visit.

Finally, although certain cervical cerclage devices have been described herein in accordance with the teachings of the present disclosure, the scope of coverage of this patent is not limited thereto. On the contrary, while the disclosed devices have been shown and described in connection with various examples, it is apparent that certain changes and modifications, in addition to those mentioned above, may be made. This patent application covers all examples of the teachings of the disclosure that fairly fall within the scope of permissible equivalents. Accordingly, it is the intention to protect all variations and modifications that may occur to one of ordinary skill in the art.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112 (f) unless traditional means-plus-function language is expressly recited, such as "means for" or "step for" language being explicitly recited in the claim(s).

What is claimed is:

1. A noninvasive suture delivery device, the device comprising:
    a housing including a distal end and a trigger;
    an arm assembly operably coupled to the distal end of the housing, the arm assembly including a tubular body and a distal end; and
    a suture including a closed loop and a string, the closed loop defining an opening extending from the distal end of the arm assembly, the string extending from the closed loop and through the tubular body of the arm assembly;
    wherein when the trigger is activated, a dimension of the opening of the closed loop decreases wherein the arm assembly includes a first arm and a second arm, and the tubular body includes a tube of the first arm and a tube of the second arm.

2. The device of claim 1, wherein the string is operably coupled with a tightening mechanism disposed in an interior cavity of the housing, the trigger arranged to activate the tightening mechanism to decrease the dimension of the opening of the closed loop.

3. The device of claim 2, wherein the tightening mechanism is a ratchet device including a rotatable drum, wherein a portion of the string is operably coupled with the rotatable drum.

4. The device of claim 1, wherein tightening mechanism is arranged to transfer a force to the string of the suture, wherein the force is in a range of approximately 3 lbf to approximately 6 lbf.

5. The device of claim 1, wherein the string of the suture includes a first portion and a second portion, the first portion extending through the tube of the first arm and the second portion extending through the tube of the second arm.

6. The device of claim 5, wherein the closed loop includes a first loop concentrically aligned with a second loop, the first loop connected to the first portion of the string and the second loop connected to the second portion of the string.

7. The device of claim 1, wherein the arm assembly includes a movable spacer disposed between the first and second arms, wherein when the movable spacer moves in a first direction, a space between the first and second arms increases, and when the spacer moves in a second direction, the space between the first and second arms decreases.

8. The device of claim 7, wherein the spacer is operably coupled to a rotatable knob, wherein when the knob is rotated in a first direction, the space between the first and second arms increases, and when the knob is rotated in a second direction, opposite the first direction, the space between the first and second arms decreases.

9. A noninvasive suture delivery device, the device comprising:
a handle including a lever operably coupled with a rotatable drum;
an arm including a proximal end operably coupled with a distal end of the handle; and
a suture including a closed loop extending from a distal end of the arm and a string connected to the closed loop and operably coupled to the rotatable drum of the handle;
wherein when the lever of the handle is compressed, the rotatable drum rotates in a first direction to decrease a dimension of the closed loop; wherein the arm includes a first arm having a tubular body and a second arm having a tubular body; and wherein the string includes a first portion connected to a first loop and disposed through the tubular body of the first arm, and a second portion connected to a second loop and disposed through the tubular body of the second arm; and wherein the first and second loops are concentrically arranged to define the closed loop.

10. The device of claim 9, further comprising an opening in the handle disposed between the rotatable drum and the distal end of the handle, the string accessible through the opening of the handle.

11. The device of claim 9, further comprising an indicator assembly operably coupled to the rotatable drum and movable between a first position and a second position spaced from the first position, wherein when the indicator assembly is in the first position, a torque in the rotatable drum is greater than a restraining torque provided by a spring coupled to the rotatable drum, and when the indicator assembly is in the second position, the torque in the rotatable drum is equal to or less than the restraining torque provided by the spring.

12. A cervical suture deployment device, comprising:
a handle;
an elongated member extending from the handle, the elongated member configured to be inserted into the vagina for use in a cervical cerclage procedure, the elongated member including a lumen therethrough and a distal opening;
a suture disposed at least partially in the lumen and attached to the handle to be pulled by the handle relative to the elongated member, the suture including a preformed loop at a distal end of the suture that is configured to be deployed through the distal opening of the elongated member, wherein the preformed loop is sized to surround a cervix of a patient in a loose state, wherein the suture is configured to tighten the preformed loop around the cervix when pulled by the handle to a tightened state and a cutting mechanism disposed on the elongated member for cutting the suture, wherein the cutting mechanism includes a button actuator disposed on an underside of the elongated member, wherein pressing the button actuator advances the cutting mechanism to sever the suture" after "tightened state.

13. The device of claim 12, further comprising a deployment mechanism operatively connected to the elongated member and the suture to deploy the suture through the distal opening.

14. The device of claim 13, wherein the deployment mechanism is a slider configured to slide relative to the elongated member.

15. The device of claim 12, wherein the preformed loop includes a one-way slip tie such that the preformed loop can be tightened by being proximally pulled but not loosened.

16. The device of claim 12, wherein the handle includes a lever operatively connected to a rotating member that is mounted to the handle to rotate relative to the handle, wherein a proximal end of the suture is attached to the rotating member to be pulled by the rotating member when the lever is actuated.

17. The device of claim 12, further comprising a deployment mechanism operatively connected to the elongated member and the suture to deploy the suture through the distal opening, wherein the deployment mechanism is a slider configured to slide relative to the elongated member, wherein the slider includes a second cutting mechanism disposed thereon extending into the lumen.

* * * * *